(12) United States Patent
Zakharchenko et al.

(10) Patent No.: US 12,555,270 B2
(45) Date of Patent: *Feb. 17, 2026

(54) PATCH DATA UNIT CODING AND DECODING FOR POINT-CLOUD CODING

(71) Applicant: Huawei Technologies Co., Ltd., Shenzhen (CN)

(72) Inventors: Vladyslav Zakharchenko, Sunnyvale, CA (US); Jianle Chen, San Diego, CA (US); Kangying Cai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,293

(22) Filed: May 31, 2024

(65) Prior Publication Data

US 2024/0404113 A1 Dec. 5, 2024

Related U.S. Application Data

(63) Continuation of application No. 17/466,844, filed on Sep. 3, 2021, now Pat. No. 12,002,243, which is a
(Continued)

(51) Int. Cl.
*G06T 9/00* (2006.01)
*G06T 15/08* (2011.01)
(Continued)

(52) U.S. Cl.
CPC ................ *G06T 9/00* (2013.01); *G06T 15/08* (2013.01); *H04N 19/20* (2014.11); *H04N 19/54* (2014.11); *H04N 19/597* (2014.11); *H04N 19/70* (2014.11)

(58) Field of Classification Search
CPC ........... G06T 9/00; G06T 15/08; G06T 9/001; G06T 2207/10028; G06T 9/004;
(Continued)

(56) References Cited

U.S. PATENT DOCUMENTS 7,162,091 B2   1/2007   Wang et al.
2005/0052294 A1   3/2005   Liang et al.
(Continued)

FOREIGN PATENT DOCUMENTS

CN   1950832 A   4/2007
WO   2018130491 A1   7/2018
(Continued)

OTHER PUBLICATIONS

U.S. Appl. No. 62/740,671, Specification, filed Oct. 3, 2018 (Year: 2018).*
(Continued)

*Primary Examiner* — Jose L Couso
(74) *Attorney, Agent, or Firm* — Conley Rose, P.C.

(57) ABSTRACT

A method of point cloud coding (PCC) including receiving encoded patch information data; obtaining a patch corresponding to the encoded patch information data, the patch having a patch type; determining whether the patch type for the patch is a last patch type; and terminating a reconstruction process corresponding to the encoded patch information data when the patch type is the last patch type. Another method includes the same receiving and obtaining steps, but determining whether the patch type for the patch is a skip patch type; decoding a reference patch index corresponding to the patch when the patch type is the skip patch type; determining a reference index for the patch based on a reference frame index corresponding to the patch and the reference patch index as decoded when the patch type is the skip patch type; and reconstructing a volumetric representation of the patch.

13 Claims, 25 Drawing Sheets

Related U.S. Application Data continuation of application No. PCT/US2020/022395, filed on Mar. 12, 2020.

(60) Provisional application No. 62/817,391, filed on Mar. 12, 2019.

(51) Int. Cl.
*H04N 19/20* (2014.01)
*H04N 19/54* (2014.01)
*H04N 19/597* (2014.01)
*H04N 19/70* (2014.01)

(58) Field of Classification Search
CPC ........... G06T 17/00; G06T 9/007; G06T 9/40;
G06T 17/005; G06T 7/50; G06T 7/60;
G06T 15/04; H04N 19/20; H04N 19/54;
H04N 19/597; H04N 19/70; H04N
19/105; H04N 19/44; H04N 19/184;
H04N 19/96; H04N 19/167; H04N 19/60;
H03M 7/30; H03M 7/3059; H03M
7/6035; H03M 7/6064; H03M 7/70;
G06V 10/25; G06V 10/50
See application file for complete search history.

(56) References Cited

U.S. PATENT DOCUMENTS

| | | | |
|---|---|---|---|
| 2005/0053145 A1 | 3/2005 | Hsu et al. | |
| 2005/0198346 A1 | 9/2005 | Wang et al. | |
| 2018/0268570 A1 | 9/2018 | Budagavi et al. | |
| 2019/0087978 A1 | 3/2019 | Tourapis et al. | |
| 2019/0087979 A1 | 3/2019 | Mammou et al. | |
| 2019/0122393 A1 | 4/2019 | Sinharoy et al. | |
| 2019/0362546 A1 | 11/2019 | Wayenberg | |
| 2020/0021847 A1 | 1/2020 | Kim et al. | |
| 2020/0112745 A1* | 4/2020 | Joshi | H04N 13/275 |
| 2020/0327703 A1* | 10/2020 | Aflaki Beni | G06T 9/20 |
| 2021/0174559 A1 | 6/2021 | Nakagami et al. | |
| 2021/0217202 A1* | 7/2021 | Zakharchenko | H04N 19/597 |
| 2022/0164994 A1* | 5/2022 | Joshi | G06T 9/001 |

FOREIGN PATENT DOCUMENTS

| | | |
|---|---|---|
| WO | 2018234206 A1 | 12/2018 |
| WO | 2019055963 A1 | 3/2019 |
| WO | 2019142666 A1 | 7/2019 |
| WO | 2020148603 A1 | 7/2020 |

OTHER PUBLICATIONS

"Line Transmission of Non-Telephone Signals, Video Codec for Audiovisual Services at p x 64 kbits," ITU-T, H.261, Mar. 1993, 29 pages.
"Transmission of Non-Telephone Signals, Information Technology—Generic Coding of Moving Pictures and Associated Audio Information: Video," H.262, Jul. 1995, 211 pages.
"Series H: Audiovisual and Multimedia Systems, Infrastructure of audiovisual services—Coding of moving video, Video coding for low bit rate communication," ITU-T, H.263, Jan. 2005, 226 pages.
"Series H: Audiovisual and Multimedia Systems, Infrastructure of audiovisual services—Coding of moving video, Advanced video coding for generic audiovisual services, " ITU-T, H.264, Jun. 2019, 836 pages.
"Series H: Audiovisual and Multimedia Systesm, Infrastructure of audiovisual services—Coding of moving video, High efficiency video coding," H.265, Apr. 2013, 317 pages.
3DG, "V-PCC Codec description," ISO/IEC JTC1/SC29/WG11 MPEG2019/N18190, Jan. 2019, 38 pages.
"Information technology—Coded Representation of Immersive Media—Part 5: Video-Base Point Cloud Compression, Study of CD Stage," ISO/IEC 23090-5:2019(E), ISO/IEC JTC 1/ SC 29/WG 11, Feb. 23, 2019, 102 pages, XP030212725.
Alexis Michael Tourapis, et al., "PCC Core Experiment 2.24 on High Level Syntax," MPEG Meeting; Jan. 14, 2019-Jan. 18, 2019; Marrakech; (Motion Picture Expert Group or ISO/IEC JTC1/SC29/WG11), No. w18252, Feb. 7, 2019, 2 pages, XP030212786.
Alexis Michael Tourapis, et al., "[V-PCC] [New proposal] Layer/Independent patch identification and coding," No. m46585, Jan. 17, 2019, 7 pages, XP030215451.
Sevom, V.F., et al., "Geometry-Guided 3D Data Interpolation for Projection-Based Dynamic Point Cloud Coding," 2018 7th European Workshop on Visual Information Processing (EUVIP), IEEE, Nov. 26-28, 2018, 6 pages.
3DG, "V-PCC Codec Description," ISO/IEC JTC 1/SC 29/WG 11, N18892, Nov. 13, 2019, 65 pages.
V.Zakharchenko."V-PCC Codec description",ISO/IEC JTC1/SC29/WG11 MPEG2018/N18017,Oct. 2018,total 32 pages.

* cited by examiner

PATCH DATA UNIT CODING AND DECODING FOR POINT-CLOUD CODING

CROSS-REFERENCE TO RELATED APPLICATIONS

This application is a continuation of U.S. patent application Ser. No. 17/466,844 filed on Sep. 3, 2021, which is a continuation of International Application No. PCT/US2020/022395 filed on Mar. 12, 2020, which claims the benefit of U.S. Provisional Patent Application No. 62/817,391, filed Mar. 12, 2019, each of which is hereby incorporated by reference.

TECHNICAL FIELD

The present disclosure is generally related to point cloud coding, and is specifically related to the high-level syntax for point cloud coding.

BACKGROUND

The point cloud is employed in a wide variety of applications including entertainment industry, intelligent automobile navigation, geospatial inspection, three dimensional (3D) modeling of real world objects, visualization etc. Considering the non-uniform sampling geometry of the point cloud, compact representations for storage and transmission of such data is useful. Compared with the other 3D presentations, the irregular point cloud is more general and applicable for a wider range of sensors and data acquisition strategies. For example, when performing a 3D presentation in a virtual reality world or remote renderings in a telepresence environment, the rendering of virtual figures and real-time instructions are processed as a dense point cloud data set.

SUMMARY

A first aspect relates to a method of point cloud coding (PCC) implemented by a decoder. The method includes receiving, by a receiver of the decoder, encoded patch information data; obtaining, by a processor of the decoder, a patch corresponding to the encoded patch information data, the patch having a patch type (patch_mode); determining, by the processor, whether the patch type for the patch is a last patch type; and terminating, by the processor, a reconstruction process corresponding to the encoded patch information data when the patch type is the last patch type.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

A second aspect relates to a method of point cloud coding (PCC) implemented by a decoder. The method includes receiving, by a receiver of the decoder, encoded patch information data; obtaining, by a processor of the decoder, a patch corresponding to the encoded patch information data, the patch having a patch type (patch_mode); determining, by the processor, whether the patch type for the patch is a skip patch type; decoding, by the processor, a reference patch index (spdu_patch_index) corresponding to the patch when the patch type is the skip patch type; determining, by the processor, a reference index (refIdx) for the patch based on a reference frame index ([refFrmIdx]) corresponding to the patch and the reference patch index as decoded when the patch type is the skip patch type; and reconstructing, by the processor, a volumetric representation of the patch based on the reference index that was determined when the patch type is the skip patch type.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

In a first implementation form of the method according to the second aspect as such, the method further comprises determining that the patch type for the patch is an intra patch type; determining the reference index (refIdx) for the patch based on a frame index ([frmIdx]) corresponding to the patch and a decremented patch index; decoding the patch using two dimensional (2D) components corresponding to the patch and three dimensional (3D) components corresponding to the patch; and reconstructing the volumetric representation based on the patch as decoded.

In a second implementation form of the method according to the second aspect as such or any preceding implementation form of the second aspect, the method further comprises determining that the patch type for the patch is an inter patch type; decoding a second reference patch index (dpdu_patch_index) corresponding to the patch; determining the reference index (refIdx) for the patch based on the reference frame index ([refFrmIdx]) corresponding to the patch and the second reference patch index as decoded; decoding the patch using two dimensional (2D) components corresponding to the patch and three dimensional (3D) components corresponding to the patch; and reconstructing the volumetric representation based on the patch as decoded.

In a third implementation form of the method according to the second aspect as such or any preceding implementation form of the second aspect, the method further comprises determining that the patch type for the patch is a pulse code modulation (PCM) patch type; determining the reference index (refIdx) for the patch based on a frame index ([frmIdx]) corresponding to the patch and a decremented patch index; decoding the patch using two dimensional (2D) components for independent points corresponding to the patch and three dimensional (3D) components for the independent points corresponding to the patch; and reconstructing the volumetric representation based on the patch as decoded.

In a fourth implementation form of the method according to the second aspect as such or any preceding implementation form of the second aspect, the method further comprises receiving an input corresponding to the encoded patch information data, wherein the input comprises one or more of the patch_mode, a patch index, the reference index, a frame index, and a reference frame index.

In a fourth implementation form of the method according to the second aspect as such or any preceding implementation form of the second aspect, the method further comprises displaying, on a display of an electronic device, an image generated based on the volumetric representation as reconstructed.

A third aspect relates to a method of point cloud coding (PCC) implemented by a decoder. The method includes receiving, by a receiver of the decoder, encoded patch information data; obtaining, by a processor of the decoder, a patch corresponding to the encoded patch information data, the patch having a patch type (patch_mode); determining, by the processor, whether the patch type for the patch is a skip patch type; decoding, by the processor, a reference patch index (spdu_patch_index) corresponding to the patch when the patch type is the skip patch type; determining, by the processor, a reference index (refIdx) for the patch based on a reference frame index ([refFrmIdx]) corresponding to the patch and the reference patch index as decoded when the patch type is the skip patch type; reconstructing, by the processor, a volumetric representation of the patch based on the reference index that was determined when the patch type is the skip patch type; determining, by the processor, whether a more patches available flag has a first value or a second value; storing, in a memory of the decoder, the volumetric representation as reconstructed when the more patches available flag has the first value; and terminating, by the processor, a reconstruction process of the encoded patch information data when the more patches available flag has the second value.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

In a first implementation form of the method according to the third aspect as such, the method further comprises determining that the patch type for the patch is an intra patch type; determining the reference index (refIdx) for the patch based on a frame index ([frmIdx]) corresponding to the patch and a decremented patch index; decoding the patch using two dimensional (2D) components corresponding to the patch and three dimensional (3D) components corresponding to the patch; and reconstructing the volumetric representation based on the patch as decoded.

In a second implementation form of the method according to the third aspect as such, the method further comprises determining that the patch type for the patch is an inter patch type; decoding a second reference patch index (dpdu_patch_index) corresponding to the patch; determining the reference index (refIdx) for the patch based on the reference frame index ([refFrmIdx]) corresponding to the patch and the second reference patch index as decoded; decoding the patch using two dimensional (2D) components corresponding to the patch and three dimensional (3D) components corresponding to the patch; and reconstructing the volumetric representation based on the patch as decoded.

In a third implementation form of the method according to the third aspect as such, the method further comprises determining that the patch type for the patch is a pulse code modulation (PCM) patch type; determining the reference index (refIdx) for the patch based on a frame index ([frmIdx]) corresponding to the patch and a decremented patch index; decoding the patch using two dimensional (2D) components for independent points corresponding to the patch and three dimensional (3D) components for the independent points corresponding to the patch; and reconstructing the volumetric representation based on the patch as decoded.

In a fourth implementation form of the method according to the third aspect as such, the method further comprises receiving an input corresponding to the encoded patch information data, wherein the input comprises one or more of the patch_mode, a patch index, the reference index, a frame index, and a reference frame index.

In a fifth implementation form of the method according to the third aspect as such, the method further comprises displaying, on a display of an electronic device, an image generated based on the volumetric representation as reconstructed.

A fourth aspect relates to a method of point cloud coding (PCC) implemented by an encoder. The method includes obtaining, by a receiver of the encoder, a patch frame data unit (pfdu) identifying a patch type (pdfu_patch_mode) for each of a plurality of patches; determining, by a processor of the encoder, whether the patch type for a patch from the plurality of patches is a last patch type; encoding, by the processor of the encoder, patch information data for the patch when the patch type is not the last patch type, the patch information data including the patch type for the patch; and encoding, by the processor of the encoder, the patch information data for the patch when the patch type is set to the last patch type, the patch information data including the last patch type for the patch.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

In a first implementation form of the method according to the fourth aspect as such, the patch type is one of a skip patch type, an inter patch type, an intra patch type, and a pulse code modulation (PCM) patch type.

In a second implementation form of the method according to the fourth aspect as such, the patch frame data unit includes a frame index (frmIdx), two dimensional (2D) components corresponding to the patch, and three dimensional (3D) components corresponding to the patch.

In a third implementation form of the method according to the fourth aspect as such, the patch information data includes a frame index, two dimensional (2D) components corresponding to the patch, and three dimensional (3D) components corresponding to the patch.

In a fourth implementation form of the method according to the fourth aspect as such, the method further comprises iterating the steps of determining whether the patch type is the last patch type and encoding the patch information data for subsequent patches from the plurality of patches until one of the patches from the plurality of patches is determined to have the last patch type.

In a fifth implementation form of the method according to the fourth aspect as such, the method further comprises performing byte alignment after all of the patch information data has been encoded.

In a sixth implementation form of the method according to the fourth aspect as such, the method further comprises generating a compressed patch frame data unit after all of the patch information data has been encoded.

In a seventh implementation form of the method according to the fourth aspect as such, the method further comprises storing, in a memory of the encoder, the compressed patch frame data unit for transmission toward a decoder.

A fifth aspect relates to a method of point cloud coding (PCC) implemented by an encoder. The method includes obtaining, by a receiver of the encoder, a patch frame data unit (pfdu) for each of a plurality of patches; adding, by a processor of the encoder, a last patch flag to each of the plurality of patches; determining, by the processor of the encoder, whether a patch type for a patch from the plurality of patches is a last patch type based on a value of the last patch flag; and encoding, by the processor of the encoder, patch information data for the patch when the patch type is not the last patch type, the patch information data including the patch type and the last patch flag for the patch.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

In a first implementation form of the method according to the fifth aspect as such, the patch type is one of a skip patch type, an inter patch type, an intra patch type, and a pulse code modulation (PCM) patch type.

In a second implementation form of the method according to the fifth aspect as such, the patch frame data unit includes a frame index (frmIdx), two dimensional (2D) components corresponding to the patch, and three dimensional (3D) components corresponding to the patch.

In a third implementation form of the method according to the fifth aspect as such, the patch information data includes a frame index, two dimensional (2D) components corresponding to the patch, and three dimensional (3D) components corresponding to the patch.

In a fourth implementation form of the method according to the fifth aspect as such, the method further comprises iterating the steps of determining whether the patch type is the last patch type based on the value of the last patch flag and encoding the patch information data for subsequent patches from the plurality of patches until one of the patches from the plurality of patches is determined to have the last patch type based on the value of the last patch flag.

In a fifth implementation form of the method according to the fifth aspect as such, the method further comprises performing byte alignment after one of the patches from the plurality of patches is determined to have the last patch type based on the value of the last patch flag.

In a sixth implementation form of the method according to the fifth aspect as such, the method further comprises generating a compressed patch frame data unit after all of the patch information data has been encoded.

In a seventh implementation form of the method according to the fifth aspect as such, the method further comprises storing, in a memory of the encoder, the compressed patch frame data unit for transmission toward a decoder.

A sixth aspect relates to a decoding device including a receiver configured to receive encoded patch information; a memory coupled to the receiver, the memory storing instructions; and a processor coupled to the memory, the processor configured to execute the instructions to cause the decoding device to: obtain a patch corresponding to the encoded patch information data, the patch having a patch type (patch_mode); determine whether the patch type for the patch is a last patch type; terminate a reconstruction process corresponding to the encoded patch information data when the patch type is the last patch type.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

A seventh aspect relates to a decoding device including a receiver configured to receive encoded patch information; a memory coupled to the receiver, the memory storing instructions; and a processor coupled to the memory, the processor configured to execute the instructions to cause the decoding device to: obtain a patch corresponding to the encoded patch information data, the patch having a patch type (patch_mode); determine whether the patch type for the patch is a skip patch type; decode a reference patch index (spdu_patch_index) corresponding to the patch when the patch type is the skip patch type; determine a reference index (refIdx) for the patch based on a reference frame index ([refFrmIdx]) corresponding to the patch and the reference patch index as decoded when the patch type is the skip patch type; and reconstruct a volumetric representation of the patch based on the reference index that was determined when the patch type is the skip patch type.

Using this decoding device allows for flexible ordering of the patches in the patch buffer. That is, patches having a different patch mode (e.g., inter, intra, PCM, etc.) may be included in the patch buffer in any order. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or perfectly matched. The coding techniques also permit a syntax element, which indicates a list of the matched patches, to be removed from the signaling because the patch type signaling described herein is sufficient to represent the entire list of patches in the patch buffer. In addition, the coding techniques eliminate the need to signal a total number of patches in the patch buffer (e.g., the size of the patch buffer) and replace that process with a special termination patch type. Further, the coding techniques permit a pulse coded modulation (PCM) patch, which has typically been located at the end of a patch buffer, to be replaced with a PCM patch type indication. Therefore, the coder/decoder (a.k.a., "codec") in video coding is improved (e.g., process of encoding and decoding patches in V-PCC) relative to current codecs. As a practical matter, the improved video coding process may enhance coding efficiency, which offers the user a better user experience when videos are sent, received, and/or viewed.

An eighth aspect relates to a decoding device including a receiver configured to receive encoded patch information; a memory coupled to the receiver, the memory storing instructions; and a processor coupled to the memory, the processor configured to execute the instructions to cause the decoding device to: obtain a patch corresponding to the encoded patch information data, the patch having a patch type (patch_mode); determine whether the patch type for the patch is a skip patch type; decode a reference patch index (spdu_patch_index) corresponding to the patch when the patch type is the skip patch type; determine a reference index (refIdx) for the patch based on a reference frame index ([refFrmIdx]) corresponding to the patch and the reference patch index as decoded when the patch type is the skip patch type; reconstruct a volumetric representation of the patch based on the reference index that was determined when the patch type is the skip patch type; determine whether a more patches available flag has a first value or a second value; store the volumetric representation as reconstructed in the memory when the more patches available flag has the first value; and terminate a reconstruction process of the encoded patch information data when the more patches available flag has the second value.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

In a first implementation form of the decoding device according to the sixth, seventh, and eighth aspects as such, the decoding device further comprises a display configured to display an image generated based on the volumetric representation as reconstructed.

A ninth aspect relates to encoding device, comprising: a receiver configured to receive a three dimensional (3D) image; a memory coupled to the receiver, the memory containing instructions; a processor coupled to the memory, the processor configured to implement the instructions to cause the encoding device to: obtain a patch frame data unit (pfdu) identifying a patch type (pdfu_patch_mode) for each of a plurality of patches; determine whether the patch type for a patch from the plurality of patches is a last patch type; encode patch information data for the patch when the patch type is not the last patch type, the patch information data including the patch type for the patch; and encode the patch information data for the patch when the patch type is set to the last patch type, the patch information data including the last patch type for the patch.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

A tenth aspect relates to encoding device, comprising: a receiver configured to receive a three dimensional (3D) image; a memory coupled to the receiver, the memory containing instructions; a processor coupled to the memory, the processor configured to implement the instructions to cause the encoding device to: obtain a patch frame data unit (pfdu) for each of a plurality of patches; add a last patch flag to each of the plurality of patches; determine whether a patch type for a patch from the plurality of patches is a last patch type based on a value of the last patch flag; and encode patch information data for the patch when the patch type is not the last patch type, the patch information data including the patch type and the last patch flag for the patch.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

In a first implementation form of the encoding device according to the ninth and tenth aspects as such, the encoding device further comprises a transmitter coupled to the processor, the transmitter configured to transmit the bitstream with the patch information data as encoded toward the decoder.

An eleventh aspect relates to a coding apparatus, comprising: a receiver configured to receive a volumetric picture to encode or to receive a bitstream to decode; a transmitter coupled to the receiver, the transmitter configured to transmit the bitstream to a decoder or to transmit a decoded volumetric image to a reconstruction device configured to reconstruct the decoded volumetric picture; a memory coupled to at least one of the receiver or the transmitter, the memory configured to store instructions; and a processor coupled to the memory, the processor configured to execute the instructions stored in the memory to perform any of the methods disclosed herein.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

In a first implementation form of the coding apparatus according to the fifth aspect as such, the coding apparatus further comprises a display configured to display an image based on the patch as reconstructed.

A twelfth aspect relates to a system, comprising: an encoder; and a decoder in communication with the encoder, wherein the encoder or the decoder includes the encoding device, the decoding device, or the coding apparatus described herein.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

A thirteenth aspect relates to a mean for coding, comprising receiving means configured to receive a volumetric picture to encode or to receive a bitstream to decode, reconstruct, and project; transmission means coupled to the receiving means, the transmission means configured to transmit the bitstream to a decoder or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

Using this coding method allows for the flexible ordering of the patches in the patch frame data unit. That is, patches having a different patch mode (e.g., inter, intra, PCM, etc.) may be included in the patch frame data unit in any order. In addition, additional patches may be added to the patch frame data unit. Added patches may be added either at the end of the patch frame data unit, or at any random patch index position. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or within an acceptable tolerance. The coding techniques also permit a syntax element, which indicates a number of the matched patches, to be removed from the signaling because the patch type signaling described herein is sufficient to represent the entire list of patches in the patch frame data unit. Besides, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Multiple PCM patches are also permitted. Therefore, the coder/decoder (a.k.a., "codec") in point cloud coding is improved (e.g., the process of encoding and decoding patches in V-PCC) relative to current codecs. As a practical matter, the improved point cloud coding process may enhance coding efficiency, which offers the user a better user experience when point clouds are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
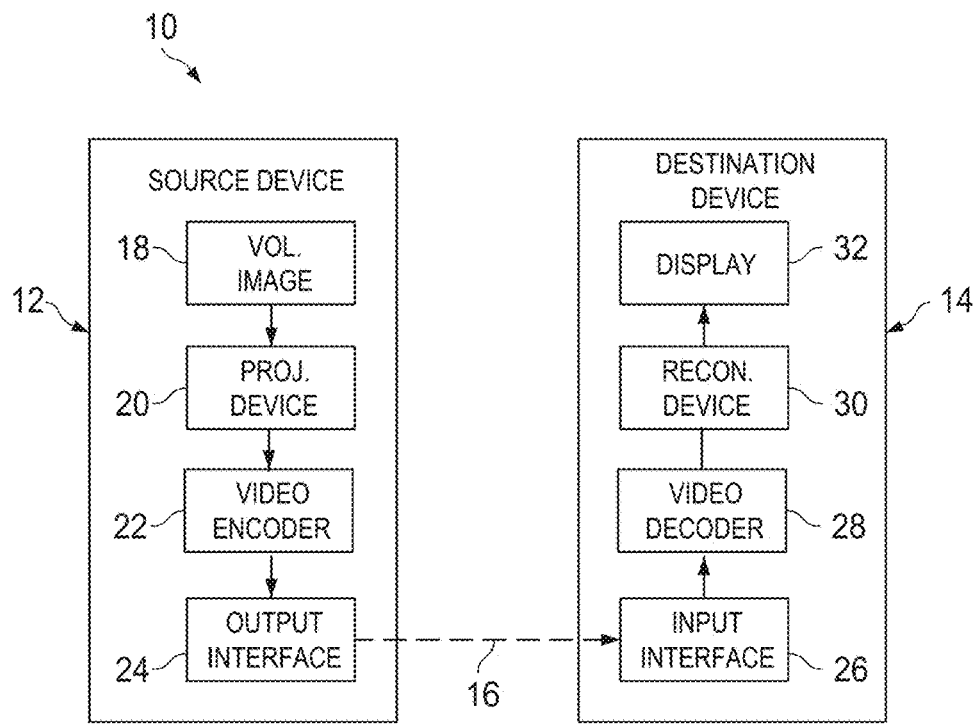
FIG. 1 is a block diagram illustrating an example coding system that may utilize context modeling techniques.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Throughout the specification and claims, the following terms take the meanings explicitly associated herein, unless the context clearly dictates otherwise. A reference patch index (e.g., spdu_patch_index) indicates the difference between the index of the current patch data unit p [in a current patch frame data unit] and the index of the reference patch data unit [in a reference patch frame data unit]. A reference index (e.g., refIdx) indicates an actual index of the reference patch data unit in the previously decoded patch frame data unit [in the decoded patch frame data unit buffer]. A reference frame index (e.g., refFrmIdx) indicates an index of the previously decoded patch frame data unit [in the decoded patch frame data unit buffer.

Video coding standards include International Telecommunications Union Telecommunication Standardization Sector (ITU-T) H.261, International Organization for Standardization (ISO)/International Electrotechnical Commission (IEC) Moving Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC), and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

A point cloud is a set of data points in the 3D space. Each data point includes parameters that determine a position (e.g., X, Y, Z), a color (e.g., R, G, B or Y, U, V), and possibly other properties like transparency, reflectance, time of acquisition, etc. Typically, each point in a cloud has the same number of attributes attached to it. Point clouds may be used in various applications such as real-time 3D immersive telepresence, content virtual reality (VR) viewing with interactive parallax, 3D free viewpoint sports replay broadcasting, geographic information systems, cultural heritage, autonomous navigation based on large-scale 3D dynamic maps, and automotive applications.

The ISO/IEC Moving Picture Experts Group (MPEG) began in 2016 the development of a new codec standard on Point Cloud Coding for lossless and lossy compressed point cloud data with substantial coding efficiency and robustness to network environments. The use of this codec standard allows point clouds to be manipulated as a form of computer data and to be stored on various storage media, transmitted and received over existing and future networks and distributed on existing and future broadcasting channels.

Recently, the point cloud coding (PCC) work was classified into three categories, PCC category 1, PCC category 2, and PCC category 3, wherein two separate working drafts were being developed, one for PCC category 2 (PCC Cat2), and the other for PCC categories 1 and 3 (PCC Cat13). The latest working draft (WD) for PCC Cat2 is included in MPEG output document N17534, and the latest WD for PCC Cat13 is included in MPEG output document N17533.

The main philosophy behind the design of the PCC Cat2 codec in the PCC Cat2 WD is to leverage existing video codecs to compress the geometry and texture information of a dynamic point cloud, by compressing the point cloud data as a set of different video sequences. In particular, two video sequences, one representing the geometry information of the point cloud data and another representing the texture information, are generated and compressed by using video codecs. Additional metadata to interpret the two video sequences, i.e., an occupancy map and auxiliary patch information, is also generated and compressed separately.

Unfortunately, the existing designs of PCC have drawbacks. For example, data units pertaining to one time instance, i.e., one access unit (AU), are not contiguous in decoding order. In the PCC Cat 2 WD, the data units of texture, geometry, auxiliary information, and the occupancy map for each AU are interleaved in the units of group of frames. That is, the geometry data for all the frames in the group is together. The same is often true for texture data, and so on. In PCC Cat13 WD, the data units of geometry and the general attributes for each AU are interleaved on the level of the entire PCC bitstream (e.g., the same as in PCC Cat2 WD when there is only one group of frames that has the same length as the entire PCC bitstream). Interleaving of data units belonging to one AU inherently causes a huge end-to-end delay that is at least equal to the length of the group of frames in presentation time duration in application systems.

Another drawback relates to the bitstream format. The bitstream format allows emulation of a start code pattern like 0x0003 and therefore does not work for transmission over MPEG-2 transport stream (TS) where start code emulation prevention is needed. For PCC Cat2, currently only group_of_frames_geometry_video_payload( ) and group_of_frames_texture_video_payload( ) have start code emulation prevention in place when either HEVC or AVC is used for coding of the geometry and texture components. For PCC Cat13, start code emulation prevention is not in place anywhere in the bitstream.

In PCC Cat 2 WD, some of the codec information (e.g., which codec, profile, level, etc., of the codec) for the geometry and texture bitstreams is deeply buried in the multiple instances of the structures group_of_frames_geometry_video_payload( ) and group_of_frames_texture_video_payload( ) Furthermore, some of the information like profile and level that indicates the capabilities for decoding of the auxiliary information and occupancy map components, as well as for point cloud reconstruction, is missing.

High-level syntax designs that solve one or more of the aforementioned problems associated with point cloud coding are provided. As will be more fully explained below, the present disclosure utilizes a type indicator in a data unit header (a.k.a., a PCC network access layer (NAL) header) to specify the type of content in the payload of the PCC NAL unit. In addition, the present disclosure utilizes a group of frames header NAL unit to carry the group of frames header parameters. The group of frames header NAL unit may also be used to signal the profile and level of each geometry or texture bitstream.

FIG. 1 is a block diagram illustrating an example coding system 10 that may utilize PCC video coding techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, digital video disks (DVD) s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes a video source 18 configured to provide a volumetric image, projection device 20, video encoder 22, and output interface 24. Destination device 14 includes input interface 26, video decoder 28, reconstruction device 30, and display device 32. In accordance with this disclosure, encoder 22 of the source device 12 and/or the decoder 28 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a coding device, the techniques may also be performed by an encoder/decoder, typically referred to as a "CODEC." Moreover, the techniques of this disclosure may also be performed by a video preprocessor. The encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive the volumetric image or video from a video content provider. As a further alternative, video source 18 may generate the volumetric image or computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications.

The projection device 20 is configured to project the volumetric image onto a planar surface (e.g., a bounding box) as more fully explained below. That is, the projection device 20 is configured to convert a three dimensional (3D) image to a two dimensional (2D) image or images.

In any case, the volumetric image, captured video, pre-captured video, or computer-generated video may be encoded by encoder 22. The encoded video information may then be output by output interface 24 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by encoder 22, which is also used by decoder 28, that includes syntax elements that describe characteristics and/or processing of blocks and other coded units, e.g., group of pictures (GOPs).

The reconstruction device 30 is configured to convert the planar image or images back to the volumetric image as more fully explained below. That is, the reconstruction device 30 is configured to convert the 2D image or images back to a 3D image.

Display device 32 displays the volumetric image or decoded video data to a user, and may comprise any of a variety of display devices such as a cathode ray tube (CRT), a liquid crystal display (LCD), a plasma display, an organic light emitting diode (OLED) display, or another type of display device.

Encoder 22 and decoder 28 may operate according to a video coding standard, such as the High Efficiency Video Coding (HEVC) standard presently under development, and may conform to the HEVC Test Model (HM). Alternatively, encoder 22 and decoder 28 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, encoder 22 and decoder 28 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Encoder 22 and decoder 28 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of encoder 22 and decoder 28 may be included in one or more encoders or decoders, either of which may be integrated as part of a combined encoder/decoder (CODEC) in a respective device. A device including encoder 22 and/or decoder 28 may comprise an integrated circuit, a microprocessor, and/or a wireless communication device, such as a cellular telephone.

Figure 2:
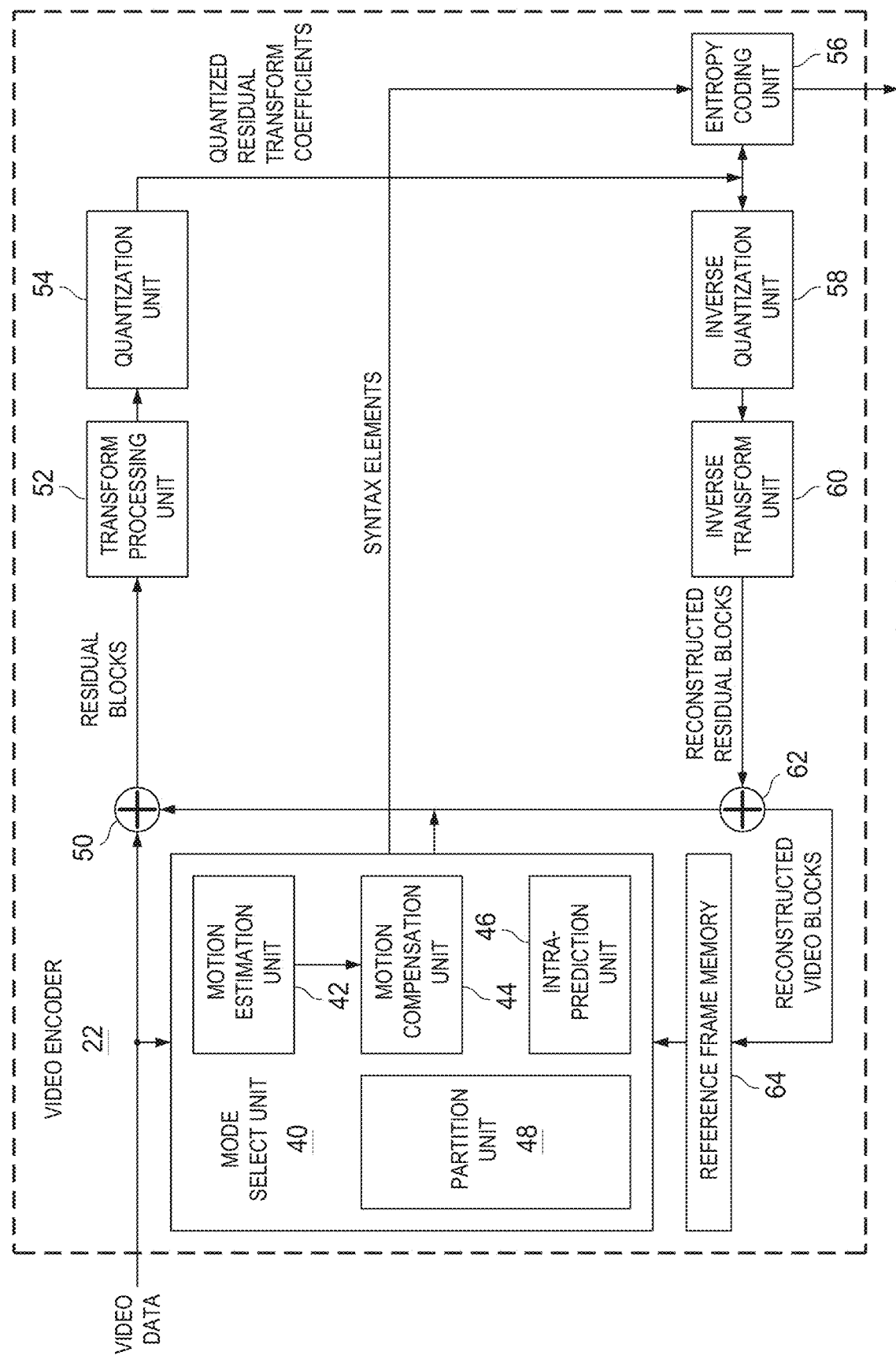
FIG. 2 a block diagram illustrating an example encoder that may implement context modeling techniques.

FIG. 2 is a block diagram illustrating an example of encoder 22 that may implement video coding techniques. Encoder 22 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, encoder 22 receives a current video block within a video frame to be encoded. In the example of FIG. 2, encoder 22 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, encoder 22 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, encoder 22 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Encoder 22 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, encoder 22 may calculate values for sub-integer pixel positions of reference pictures stored in reference frame memory 64. For example, encoder 22 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by decoder 28 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Encoder 22 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Encoder 22 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., decoder 28) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
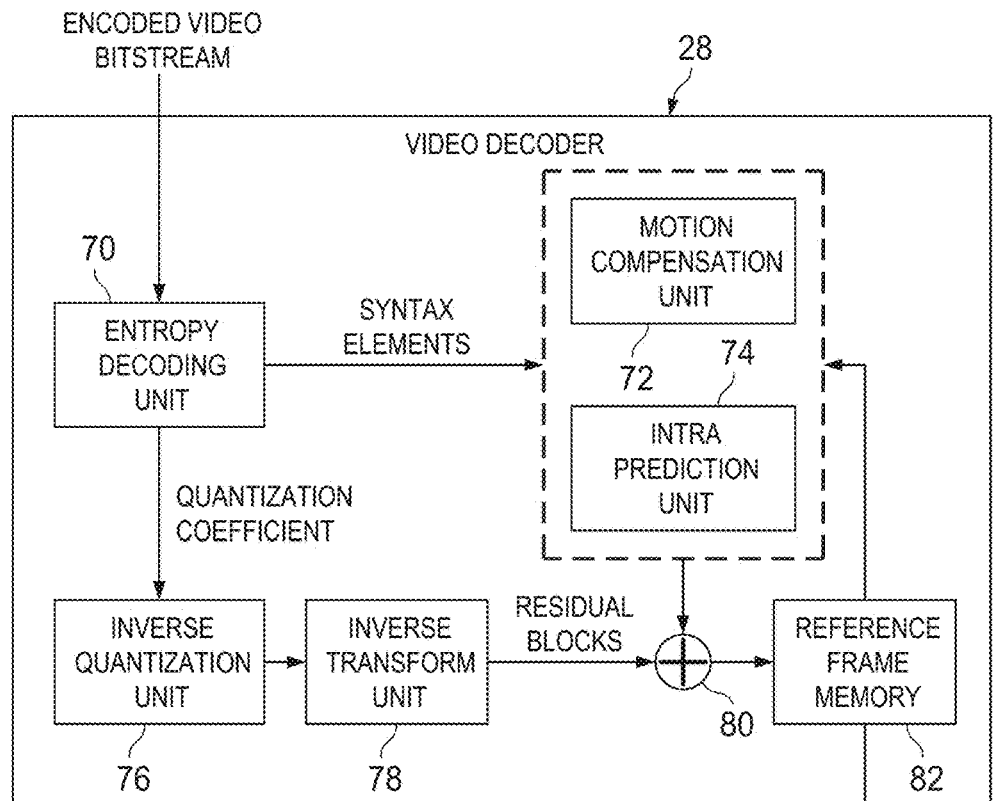
FIG. 3 a block diagram illustrating an example decoder that may implement context modeling techniques.

FIG. 3 is a block diagram illustrating an example of decoder 28 that may implement video coding techniques. In the example of FIG. 3, decoder 28 includes an entropy decoding unit 70, motion compensation unit 72, intra-prediction unit 74, inverse quantization unit 76, inverse transformation unit 78, reference frame memory 82, and summer 80. Decoder 28 may, in some examples, perform a decoding pass generally reciprocal to the encoding pass described with respect to encoder 22 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, decoder 28 receives an encoded video bitstream that represents video blocks of an encoded video slice and associated syntax elements from encoder 22. Entropy decoding unit 70 of the decoder 28 entropy decodes the bitstream to generate quantized coefficients, motion vectors or intra-prediction mode indicators, and other syntax elements. Entropy decoding unit 70 forwards the motion vectors and other syntax elements to motion compensation unit 72. Decoder 28 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Decoder 28 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by encoder 22 during encoding of the video blocks to calculate interpolated values for sub-integer pixels of reference blocks. In this case, motion compensation unit 72 may determine the interpolation filters used by encoder 22 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Conventional coding techniques require patches to be ordered according to their patch mode in a patch frame data unit (f.k.a., a patch buffer). That is, the representation of patch data unit types in the auxiliary information patch data unit in video-based point cloud coding (V-PCC) requires all patch-related information to be arranged in a certain order within the patch frame data unit. First, the matched patch data units are added to the patch data unit list, followed by the unmatched patch data units. The matched patch data units may be encoded using the differential coding (inter prediction—dpdu) and the unmatched patch data units are encoded using absolute values (intra prediction). That is, all inter coded patches must be listed first in the patch frame data unit, followed by all intra coded patches, and so on. Therefore, in order to add a new inter coded patch or a new intra coded patch to the patch frame data unit, the entire patch frame data unit must be rebuilt using the required order, which results in coding inefficiency.

Disclosed herein are coding techniques that allow for flexible ordering of the patches in the patch frame data unit. That is, patches having a different patch mode (e.g., inter, intra, PCM, etc.) may be included in the patch frame data unit in any order. The coding techniques also permit a skip patch data unit type (spdu) to be used. The skip patch data unit indicates that all of the parameters for a current patch may be inherited from a reference patch when the patch data unit elements for the current patch data unit and the reference patch data unit are identical or perfectly matched. The coding techniques also permit a syntax element, which indicates a number of the matched patches, to be removed from the signaling because the patch type signaling described herein is sufficient to represent the entire list of patches in the patch frame data unit. In addition, the coding techniques eliminate the need to signal a total number of patches in the patch frame data unit (e.g., the size of the patch frame data unit) and replace that process with a special termination patch type. Further, the coding techniques permit a pulse coded modulation (PCM) patch, which has typically been located at the end of a patch frame data unit, to be replaced with a PCM patch type indication. Therefore, the coder/decoder (a.k.a., "codec") in video coding is improved (e.g., process of encoding and decoding patches in V-PCC) relative to current codecs. As a practical matter, the improved video coding process may enhance coding efficiency, which offers the user a better user experience when point clouds are sent, received, and/or viewed.

Figure 4:
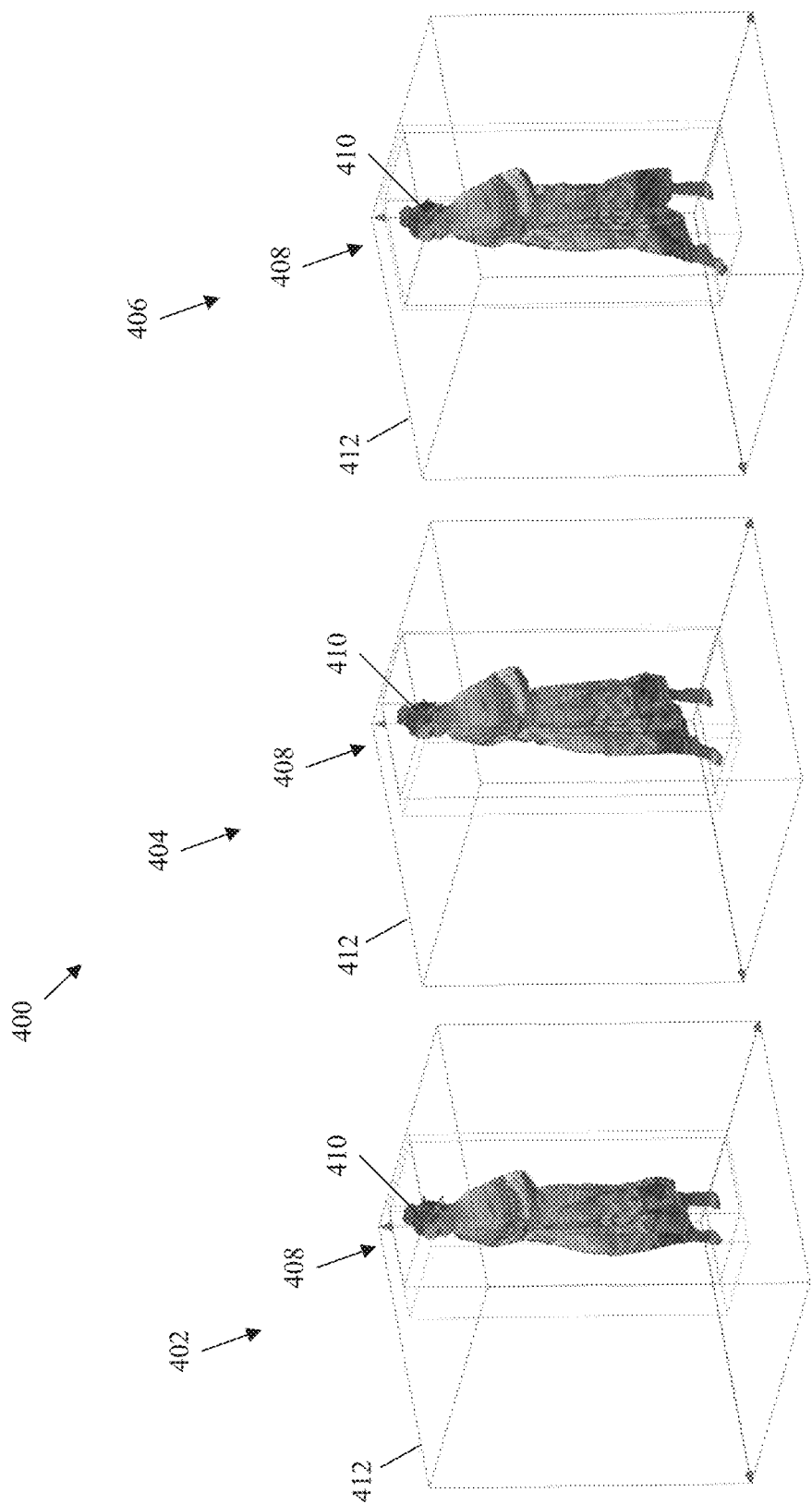
FIG. 4 is a representation of a sequence of point cloud frames each containing a three dimensional (3D) point cloud.

FIG. 4 is a representation of a sequence 400 of point cloud frames 402, 404, 406 (e.g., frame PCC_0, frame PCC_1, frame PCC_4) each containing a point cloud 408. The point cloud 408 is a volumetric representation of space on a regular 3D grid. That is, the point cloud 408 is three dimensional (3D). As shown in FIG. 4, the point cloud 408 contains point cloud content 410 within 3D space 412. The point cloud content 410 is represented by a set of points (e.g., voxels) within the 3D space 412. The voxel is a volume element representing some numerical quantity, such as the color of a point in three-dimensional space, used in the visualization and analysis of three-dimensional data. Therefore, the voxel can be thought of as the three-dimensional equivalent of a pixel in a 2D image.

Each voxel in the point cloud 408 of FIG. 4 has coordinates (e.g., x y z coordinates) and one or more attributes (e.g., a red/green/blue (RGB) color component, a reflectance, etc.). While the point cloud content 410 in FIG. 4 depicts a person, the point cloud content 410 may be any other volumetric object or image in practical applications.

Figure 5:
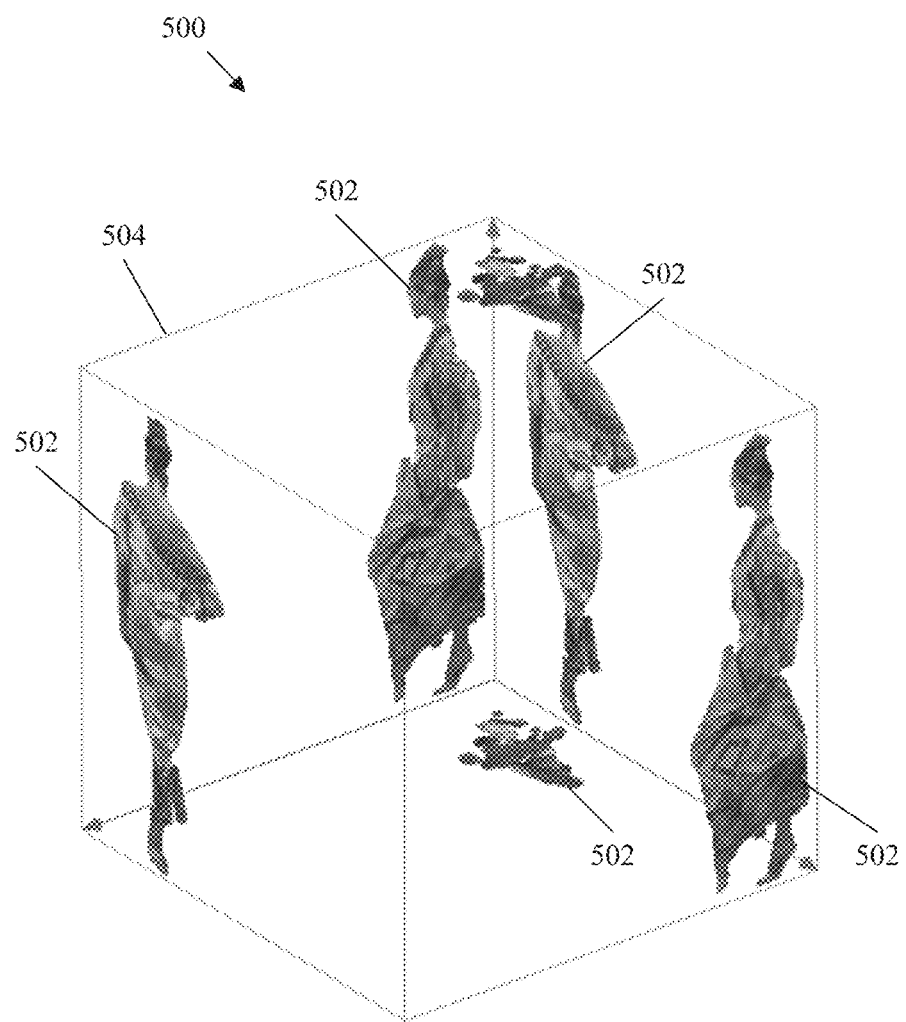
FIG. 5 is a representation of one of the 3D point clouds of FIG. 5 projected onto a bounding box to generate two dimensional (2D) projections.

FIG. 5 is a representation of the point cloud 400 of FIG. 4 projected onto a bounding box 500. As shown in FIG. 5, the bounding box 500 contains patches 502 projected onto two dimensional (2D) surfaces or planes 504 thereof. Thus, the patches 502 are 2D representations of portions of the 3D image. The patches 502 collectively correspond to the point cloud content 410 of FIG. 4. The data representation in video-based point cloud coding (V-PCC), which may also be referred to as point cloud compression, relies on this 3D to 2D conversion.

Figure 6A:
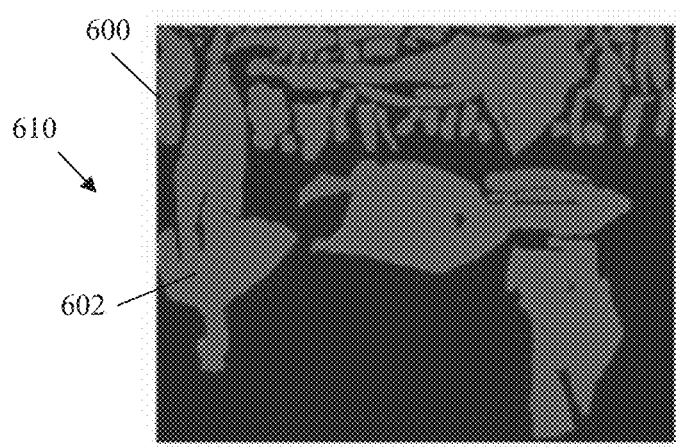
FIGS. 6A-6C are representations of an occupancy map, a geometry map, and an attribute map corresponding to the 2D projections from the bounding box of FIG. 5.
Figure 6B:
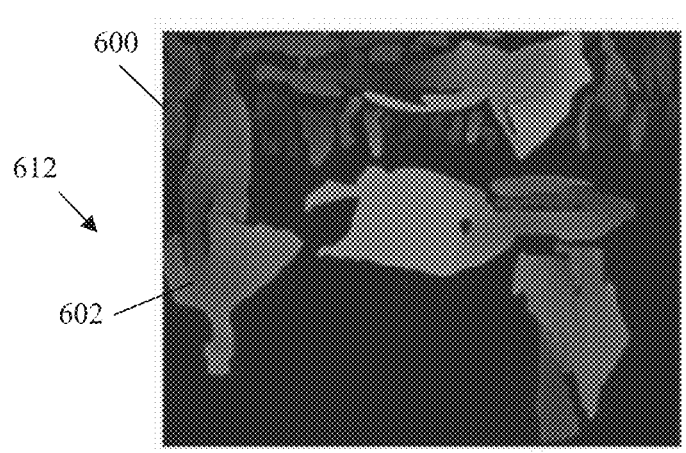
Figure 6C:
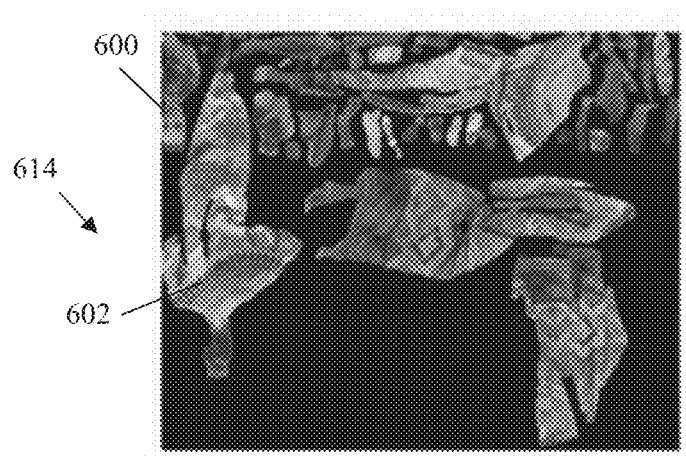

The data representation in V-PCC is described as a set of planar 2D images (e.g., the patches 502) using, for example, the occupancy map 610 of FIG. 6A, the geometry map 612 of FIG. 6B, and the attribute map 614 of FIG. 6C.

FIG. 6A is a representation of the occupancy map 610 corresponding to the 2D projections (e.g., patches 502) from the bounding box 500 of FIG. 5. The occupancy map 610 is coded in binary form. For example, a zero represents that a portion of the bounding box 600 is not occupied by one of the patches 602. Those portions of the bounding box 600 represented by the zero do not take part in reconstruction of a volumetric representation (e.g., the point cloud content 410). In contrast, a one represents that a portion of the bounding box 600 is occupied by one of the patches 602. Those portions of the bounding box 600 represented by the one do take part in reconstruction of the volumetric representation (e.g., the point cloud content 410).

FIG. 6B is a representation of the geometry map 612 corresponding to the 2D projections (e.g., patches 502) from the bounding box 500 of FIG. 5. The geometry map 612 provides or depicts the contour or topography of each of the patches 602. That is, the geometry map 612 indicates the distance of each point in the patches 602 away from the planar surface (e.g., planes 504) of the bounding box 600.

FIG. 6C is a representation of an attribute map 614 corresponding to the 2D projections (e.g., patches 502) from the bounding box 500 of FIG. 5. The attribute map 614 provides or depicts an attribute of each point in the patches 602 in the bounding box 600. The attribute in the attribute map 614 may be, for example, a color component of the point. The color component may be based on the RGB color model, the YUV color model, or based on another known color model.

Figure 7:
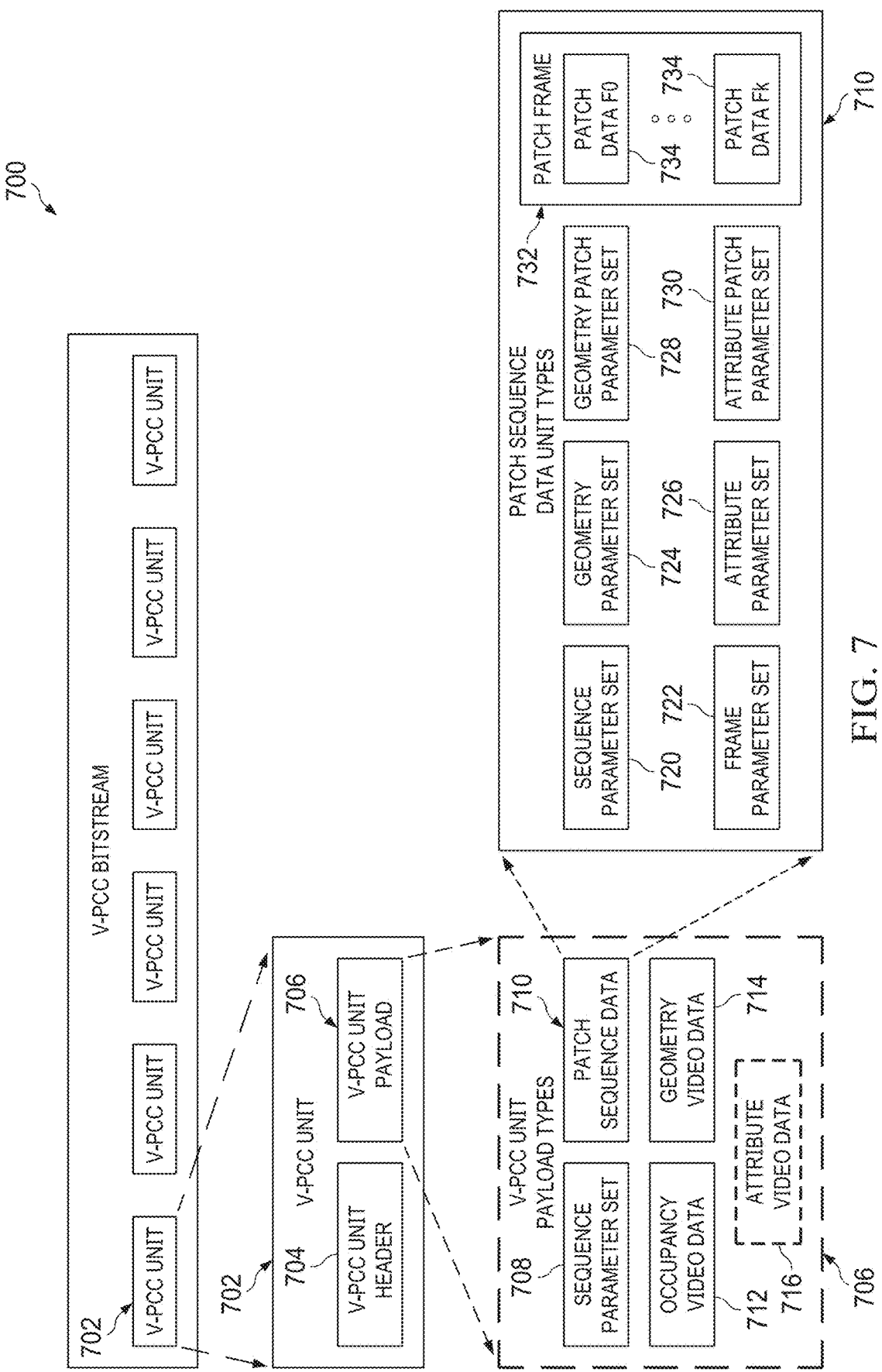
FIG. 7 is a representation of a video-based point cloud coding (V-PCC) bitstream.

FIG. 7 is a representation of a V-PCC bitstream 700. The V-PCC bitstream 700 may be utilized to carry the encoded information needed to reconstruct a point cloud (e.g., the point cloud 408 of FIG. 4). As shown, the V-PCC bitstream 700 includes a plurality of V-PCC units 702. Each V-PCC unit 702 contains a V-PCC unit header 704 and a V-PCC unit payload 706. The V-PCC unit header 704 describes the V-PCC unit payload 706 carried by the V-PCC unit 702.

The V-PCC unit payload 706 includes a sequence parameter set 708, patch sequence data 710, occupancy video data 712, geometry video data 714, and attribute video data 716 (e.g., texture video data). The sequence parameter set 708 includes parameters and information corresponding to a sequence of point clouds (e.g., the sequence 400 of point cloud frames 402, 404, 406 each containing a point cloud 408 in FIG. 4). The occupancy video data 712, the geometry video data 714, and the attribute video data 716 carry the occupancy data, geometry data, and attribute or texture data corresponding to a the point cloud or the 3D image.

The patch sequence data 710 includes parameters and information corresponding to a sequence of patches (e.g., patches 502 in FIG. 5). The patch sequence data 710 includes a sequence parameter set 720, a frame parameter set 722, a geometry parameter set 724, an attribute parameter set 726, a geometry patch parameter set 728, an attribute patch parameter set 730, and a patch frame 732.

The sequence parameter set 720 includes parameters and information corresponding to the sequence of 2D patches (e.g., the patches 502 of FIG. 5) that persists for the entire duration of the point cloud sequence or until new sequence parameter set is signaled in the bitstream. The frame parameter set 722 contains the information corresponding to the sequence of 2D patches that persists for the duration of the single frame of the point cloud sequence. The geometry parameter set 724 contains the information that corresponds to the reconstruction process of the geometry characteristics of the patch sequence data. The attribute parameter set 726 contains the information that corresponds to the reconstruction process of the attribute characteristics of the patch sequence data. The geometry patch parameter set 728 contains the information that corresponds to the decoding process of the geometry characteristics of the patch sequence data. The attribute 730 contains the information that corresponds to the decoding process of the attribute characteristics of the patch sequence data.

The patch frame data unit 732 (referred to as patch frame) includes a set of patch data units 734. The patch data units 734 collectively contain the patch data (e.g., patch data F0, . . . , Fk) for a patch (e.g., a patch 502). Each of the patch data units 734 has a patch type referred to herein as a patch mode. As will be more fully explained below, the patch mode (e.g., patch_mode) indicates how the particular patch should be treated during the coding processes.

Figure 8:
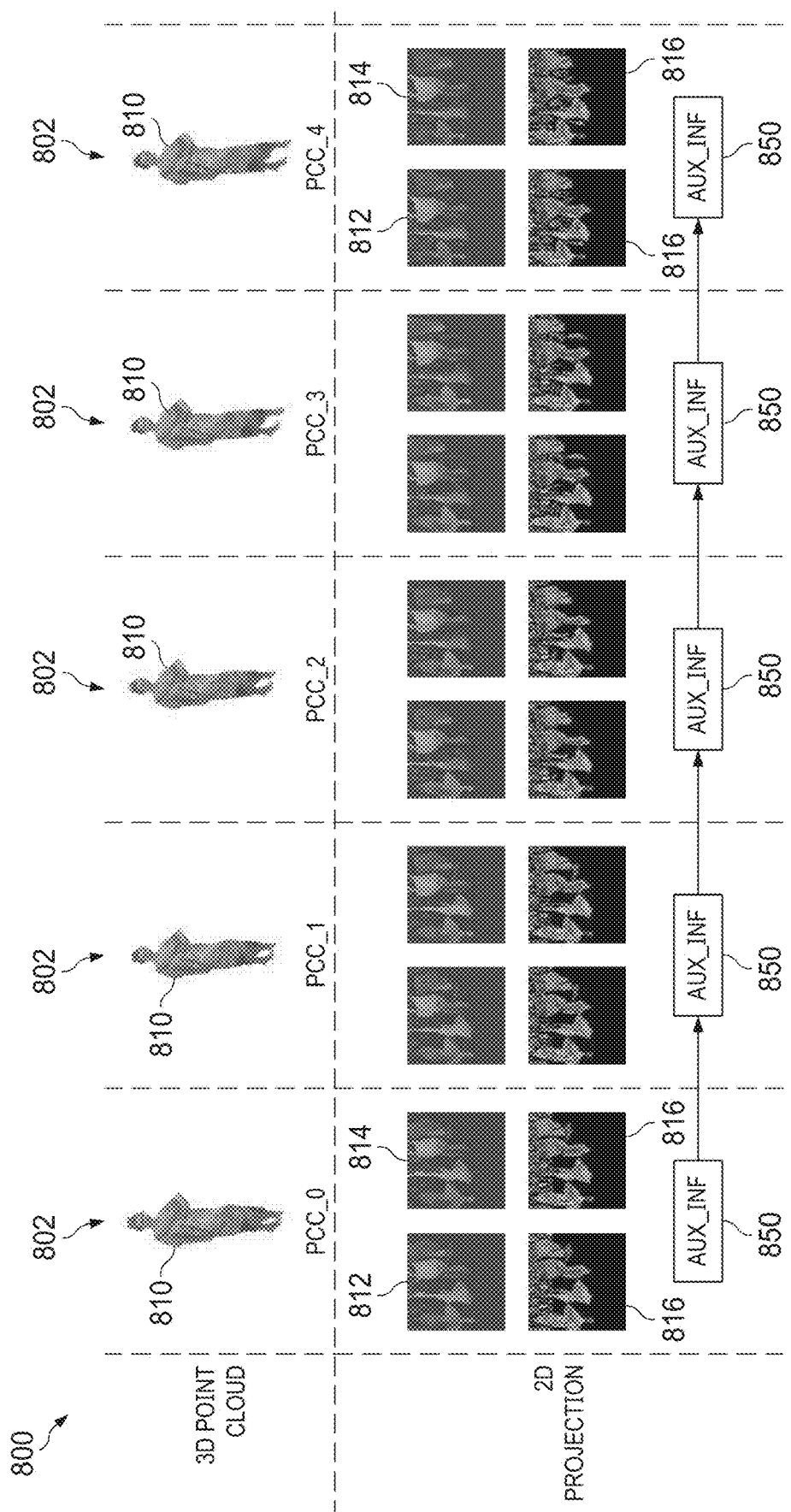
FIG. 8 is a representation of a coded decomposition of a point cloud sequence for a plurality of frames.

FIG. 8 is a representation of a coded decomposition of a point cloud sequence 800 for a plurality of frames 802. The frames 802 in FIG. 8 are similar to the point cloud frames 402, 404, 406 in FIG. 4. Thus, each of the frames 802 contains point cloud content 810 for a 3D point cloud. The point cloud content 810 in each frame 802 of FIG. 8 corresponds to an occupancy map 812, a geometry map 814, and an attribute map 816 in the 2D projection that are used to reconstruct the point cloud content 810. As shown, the 2D projection may contain more than one attribute map 816.

As shown, the point cloud sequence 800 also contains auxiliary information patch frame data units 850 (AUX_INF). In an embodiment, the auxiliary information patch frame data units 850 contain both 2D and 3D bounding box information (e.g., patch 3D bounding box 1204 and the patch 2D projection bounding box 1208 in FIG. 12). A collection of the auxiliary information patch frame data units 850 correspond to the patch sequence data 710 in FIG. 7. Each auxiliary information patch frame data units 850 contains a sequence parameter set 720, a frame parameter set 722, a geometry parameter set 724, an attribute parameter set 726, a geometry patch parameter set 728, an attribute patch parameter set 730, and a patch frame 732. In an embodiment, a patch frame 732 is included in the auxiliary information patch frame data units 850 and the rest of the components in the patch sequence data 710 are optional. In an embodiment, a collection of occupancy maps 812 correspond to the occupancy video data 712, a collection of geometry maps 814 correspond to the geometry video data 714, a collection of attribute maps 816 correspond to the attribute video data 716. Notably, an occupancy map is not present on this image. The auxiliary information patch data units 850 each correspond to the point cloud content 810 in one of the frames 802. The patch data unit (e.g., 850 contains the information used or needed to reconstruct the point cloud content 810 in the 3D point cloud based on the occupancy map 812, the geometry map 814, and the attribute map 816 in the 2D projection.

Figure 9:
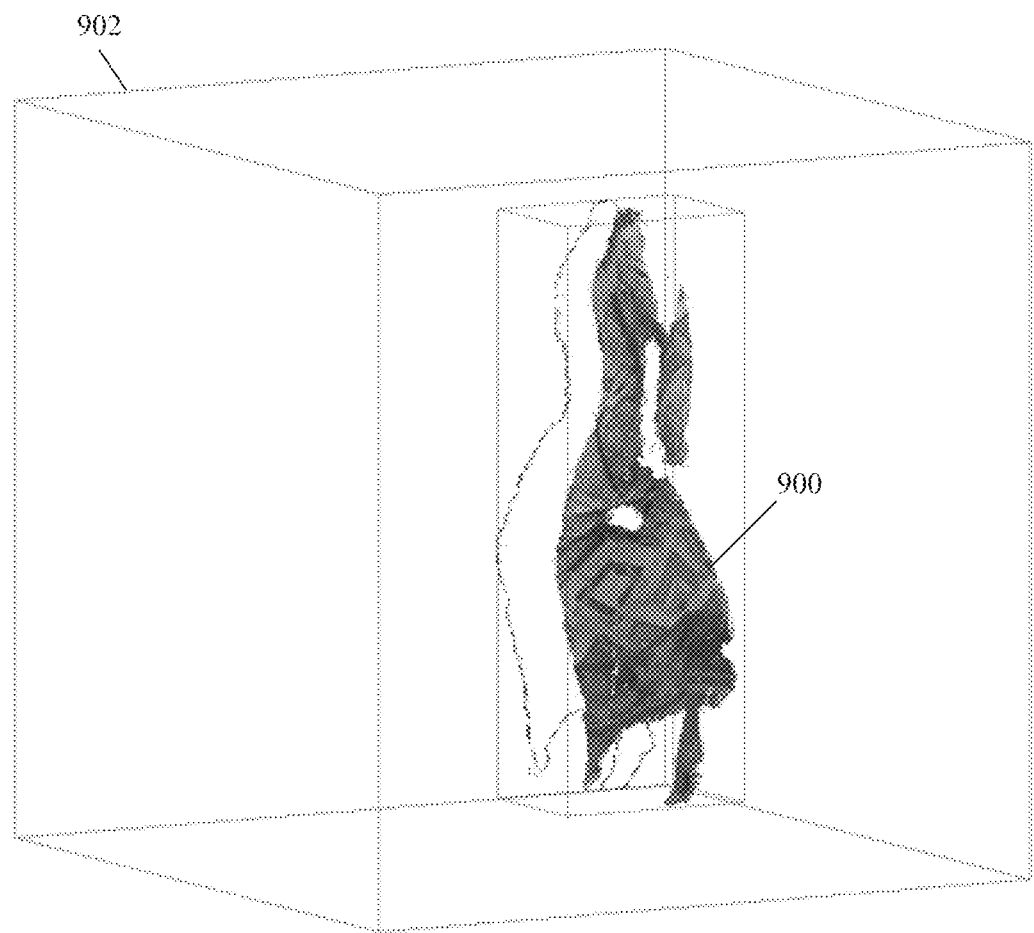
FIG. 9 is a representation of a single patch data unit extracted from one of the point cloud frames in the point cloud sequence of FIG. 8.

FIG. 9 is a representation of a single patch data unit 900 extracted from one of the point cloud frames 802 in the point cloud sequence 800 of FIG. 8. The single patch data unit 900 is similar to the patch data units 734 in the patch frame 732 of FIG. 7 or the auxiliary information patch frame data units 850. The single patch data unit 900 is depicted relative to the surrounding 3D space 902.

Figures 10A, 10B, 10C:
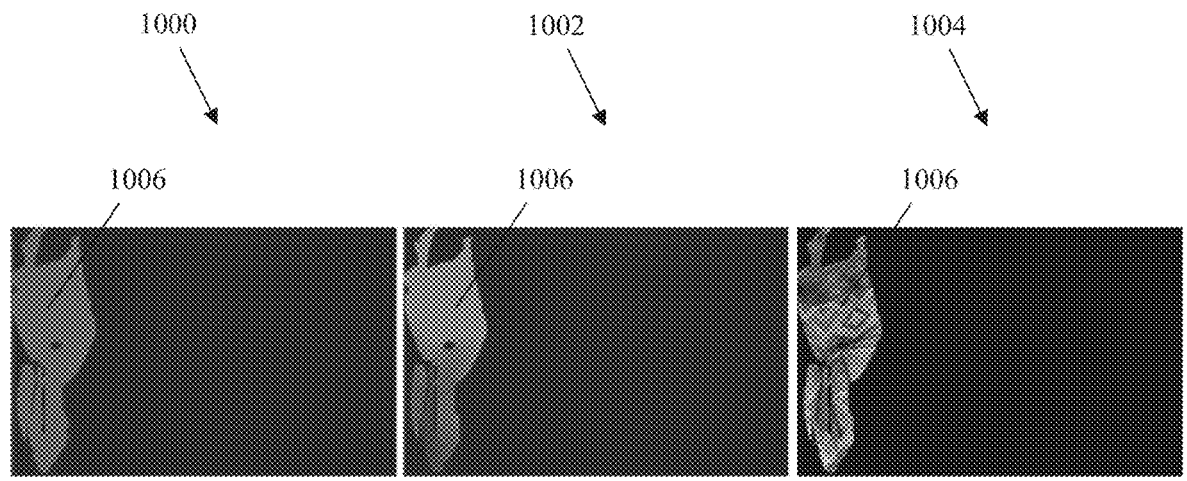
FIGS. 10A-10C are representations of an occupancy map, a geometry map, and an attribute map corresponding to the single patch data unit of FIG. 9.

FIGS. 10A-10C are representations of the occupancy map 1000, the geometry map 1002, and the attribute map 1004 corresponding to the single patch data unit 900 of FIG. 9. The occupancy map 1000, the geometry map 1002, and the attribute map 1004 are similar to the occupancy map 610, the geometry map 612, and the attribute map 614 in FIGS. 6A-6C. However, the occupancy map 1000, the geometry map 1002, and the attribute map 1004 in FIGS. 10A-10C represent only the single patch data unit 900 instead of a collection of patches 502 from the entire bounding box 500. Thus, the occupancy map 1000, the geometry map 1002, and the attribute map 1004 in FIGS. 10A-10C contain only a single patch 1006 corresponding to the single patch data unit 900 of FIG. 9.

Figure 11:
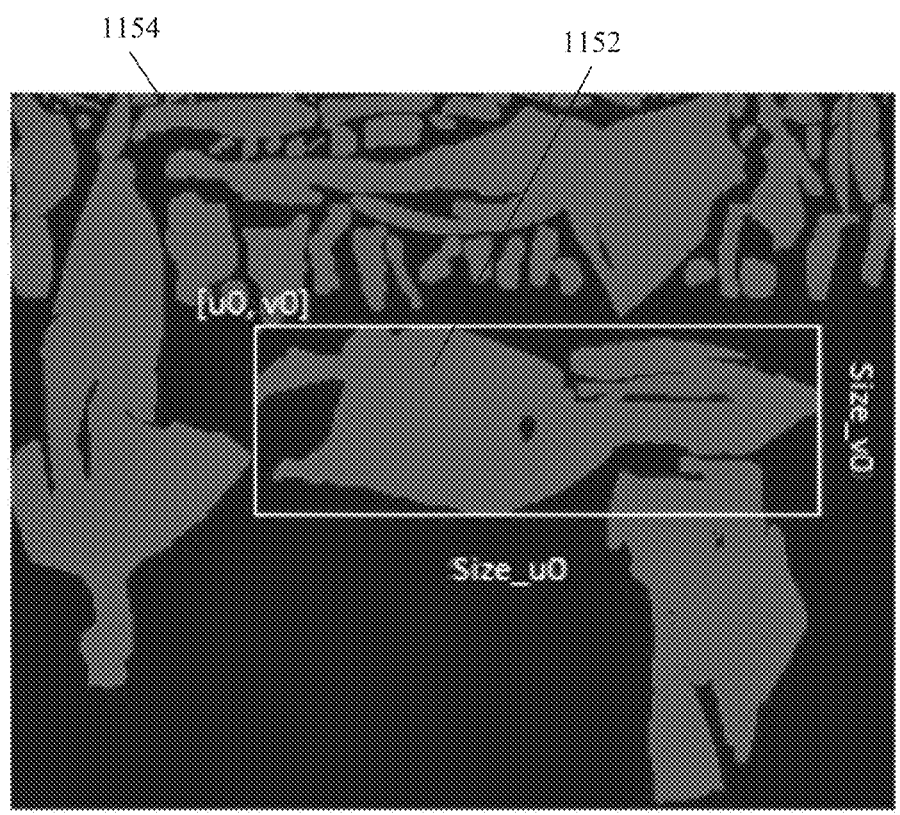
FIG. 11 is a representation of the 2D components for a patch data unit within a 2D bounding box.

FIG. 11 is a representation of the 2D components for a patch data unit 1152 within the 2D bounding box 1154. The patch data unit 1152 in FIG. 11 is similar to the single patch data unit 900 of FIG. 9. As shown in FIG. 11, the 2D components represent a patch coordinate (e.g., [u0, v0]) and dimensions (e.g., Size_u0, Size_v0) for the patch data unit 1152. These 2D components are included in a patch data unit (e.g., the patch data unit 734 of FIG. 7 or the patch data unit 850 of FIG. 8).

Figure 12A:
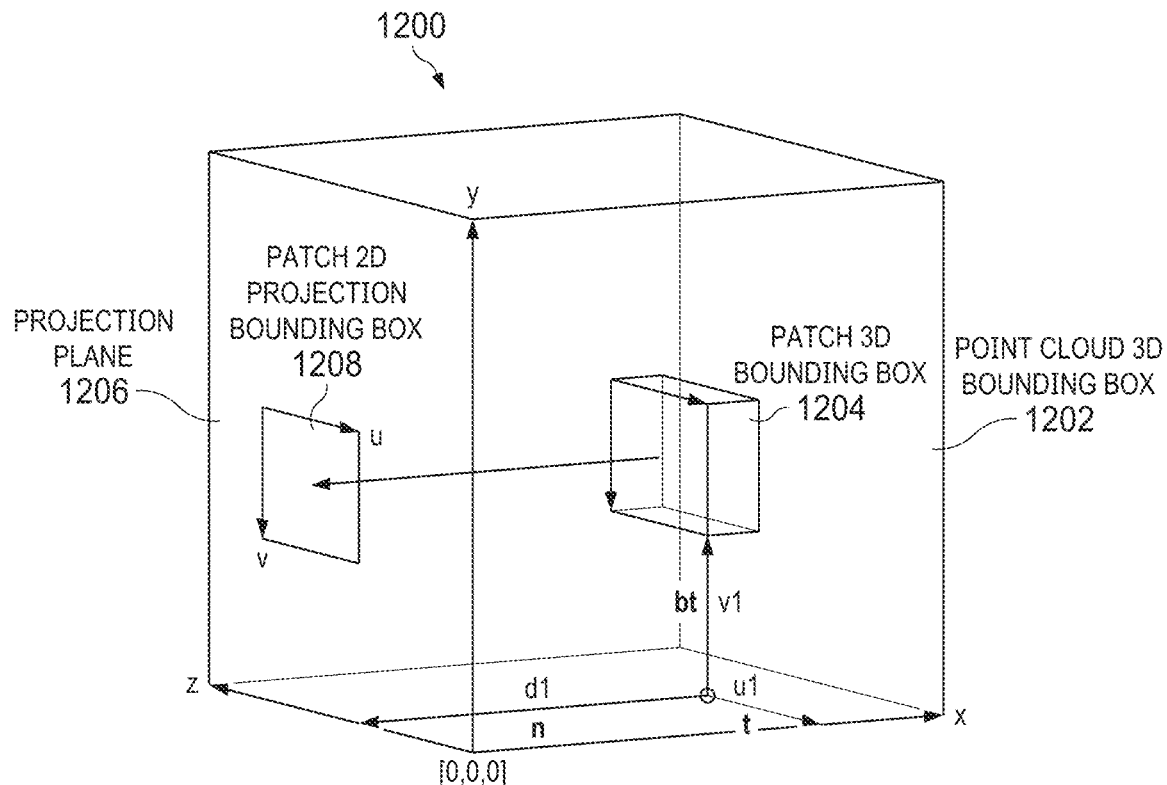
FIGS. 12A-12B are a schematic representation and a dataset representation of the 3D components for the patch data unit of FIG. 11.
Figure 12B:
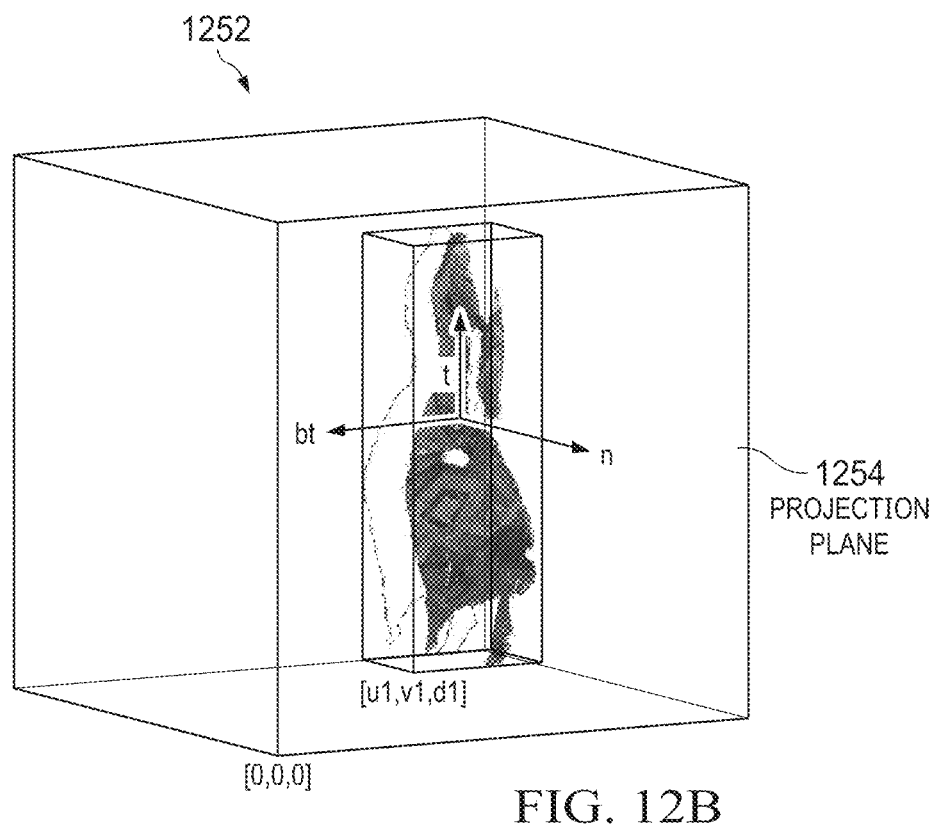

FIGS. 12A-12B are a schematic representation 1200 and a dataset representation 1252 of the 3D components for the patch data unit 1152 of FIG. 11. As shown, the schematic representation 1200 includes a point cloud 3D bounding box 1202, a patch 3D bounding box 1204, a projection plane 1206, and a patch 2D projection bounding box 1208. The various coordinates (e.g., [0,0,0]) and dimensions (e.g., x, y, z, u, v, d1, u1, v1) and vectors (b, t, bt) are used to describe the process of projecting the content of the point cloud 3D bounding box 1202 onto the patch 2D projection bounding box 1208. The dataset representation 1252 depicts the manner in which a single patch data unit 1254 (which is similar to the single patch data unit 900) can be projected onto a projection plane 1206 based on coordinates (e.g., [0,0,0], [u1, v1, d1]) and vectors (e.g., n, bt). These 3D components are also included in an patch data unit (e.g., the patch data unit 734 of FIG. 7 or the patch data unit 850 of FIG. 8).

The patch data unit (e.g., the patch data unit 734 of FIG. 7 or the patch data unit 850 of FIG. 8) contains the information needed for the 2D to 3D reconstruction process, and is represented in the following (see FIG. 11):

2d Related Components
 U0 (Patch2dShiftU)
 V0 (Patch2dShiftV)
 Size_u0 (Patch2dSizeU)
 Size_v0 (Patch2dSizeV)
and in the following (see FIGS. 12A-12B):
3d Related Components:
 u1 (Patch3dShiftTangentAxis)—distance from the 3d patch bounding box along the tangent axis (t) to the point cloud bounding box
 v1 (Patch3dShiftBiTangentAxis)—distance from the 3d patch bounding box along the bitangent axis (bt) to the point cloud bounding box
 d1 (Patch3dShiftNormalAxis)—distance from the 3d patch bounding box along the normal axis (n) to the point cloud bounding box
 n (PatchNormalAxis)—the axis that is perpendicular (normal) to the patch projection plane (any side of the bounding box can be a projection plane)
 t (Patch3dShiftTangentAxis)—the axis that is tangent to the patch surface and perpendicular to the normal axis
 bt (Patch3dShiftBiTangentAxis)—the axis that is perpendicular to normal and tangent axes As noted above, conventional coding techniques require patches (patch data units 734 of FIG. 7) to be ordered according to their patch mode in a patch frame data unit. That is, the representation of patch data unit types in the patch frame data unit in V-PCC requires all patch-related information to be arranged in a certain order within the patch frame data unit. First, the matched patch data units are added to the patch data frame, followed by the unmatched patch data units. The matched patch data units may be encoded using the differential coding (inter prediction-dpdu) and the unmatched patch data units are encoded using absolute values (intra prediction). That is, all inter coded patches must be listed first in the patch frame data unit, followed by all intra coded patches, and so on. Therefore, in order to add a new inter coded patch or a new intra coded patch to the patch frame data unit, the entire patch frame data unit must be rebuilt using the required order, which results in coding inefficiency. The methods detailed below overcome these coding inefficiencies.

Figure 13:
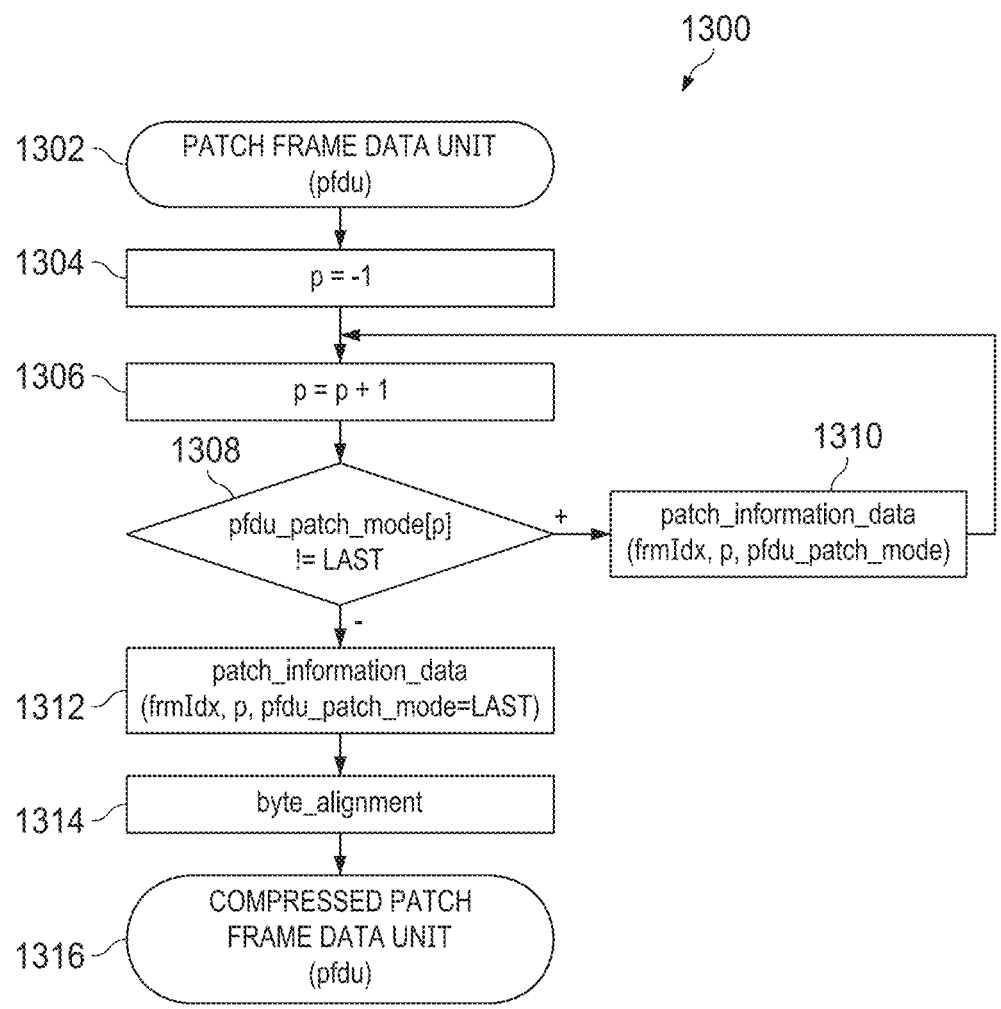
FIG. 13 is an embodiment of a patch frame data unit encoding process.

FIG. 13 is an embodiment of a patch frame data unit encoding process 1300. The patch frame data unit encoding process 1300 may be utilized to encode (a.k.a., compress) a plurality of patch data units such as the patch data unit 734 of FIG. 7. The patch frame data unit encoding process 1300 may be implemented by an encoder. Here, a patch frame data unit, which corresponds to the 2D bounding box 1154, is a collection of patch data units, which corresponds to patch data unit 1152. In an embodiment, an input to the encoding process 1300 is a collection of patch data units that correspond to a patch frame data unit.

In block 1302, a patch frame data unit (pfdu) is obtained. The patch frame data unit may be received by a receiver of the encoder. The patch frame data unit comprises of a collection of patch data units. The patch data unit identifies or includes a patch type (pdfu_patch_mode) for each of a plurality of the patch data units (e.g., patches 502). In an embodiment, the patch type is one of skip, intra, inter, PCM, or last. The skip patch type indicates that the current patch is identical to the reference patch. Therefore, the parameters from the reference patch are used in coding the current patch. The intra patch type indicates that the current patch is to be coded using intra prediction (a.k.a., intra coded). The inter patch type indicates that the current patch is to be coded using inter prediction (a.k.a., inter coded). The PCM patch type indicates that the current patch represents independent scattered points from the 3D point cloud. The last patch type indicates that the current patch is the last patch to be coded and that, therefore, the compression process of the patch frame data unit should be finished or terminated.

In block 1304, the patch data unit index (p) is decremented. By decrementing the patch data unit index, the patch data unit index may start with a negative value (e.g., −1). Therefore, when the patch data unit index is incremented in block 1306, the patch data unit index is effectively initialized to start at zero. In an embodiment, the process 1300 could also set the patch data unit index to zero initially, and then increment the patch data unit index after the loop or iterative portion of the process is performed (as will be explained below).

In block 1308, a determination of whether the patch data unit type for the current patch data unit from the plurality of patch data units in a patch frame data unit is the last patch type is made. When the current patch data unit is not the last patch, the process 1300 proceeds to block 1310. In block 1310, the patch information data is encoded for the current patch. In an embodiment, the patch information data includes a frame index (frmIdx), the patch index (p), and the patch type (pdfu_patch_mode) as well as the corresponding 2D and 3D information. After the encoding in block 1310, the process 1300 loops back to block 1306. There, the patch data unit index is incremented. By incrementing the patch index, a new current patch data unit is considered. These steps are iterated until the current patch data unit is determined to be the last patch in block 1308.

When the current patch data unit is determined to be the last patch data unit, the process 1300 proceeds to block 1312. In block 1312, the patch information data is encoded for the current patch data unit. In an embodiment, the patch information data includes a frame index (frmIdx), the patch index (p), and the patch type (pdfu_patch_mode), it should be mentioned that the last patch data unit does not have the 2D or 3D information associated to the patch data unit. Unlike in block 1310, the patch type in block 1312 is encoded as the last patch type.

In block 1314, a byte alignment process is performed. In an embodiment, byte alignment organizes or arranges the bytes of data into a desired orientation or size. Then, in block 1316, a compressed patch frame data unit is achieved. The compressed patch frame data unit may be incorporated into a bitstream for transmission toward a decoder.

Figure 14:
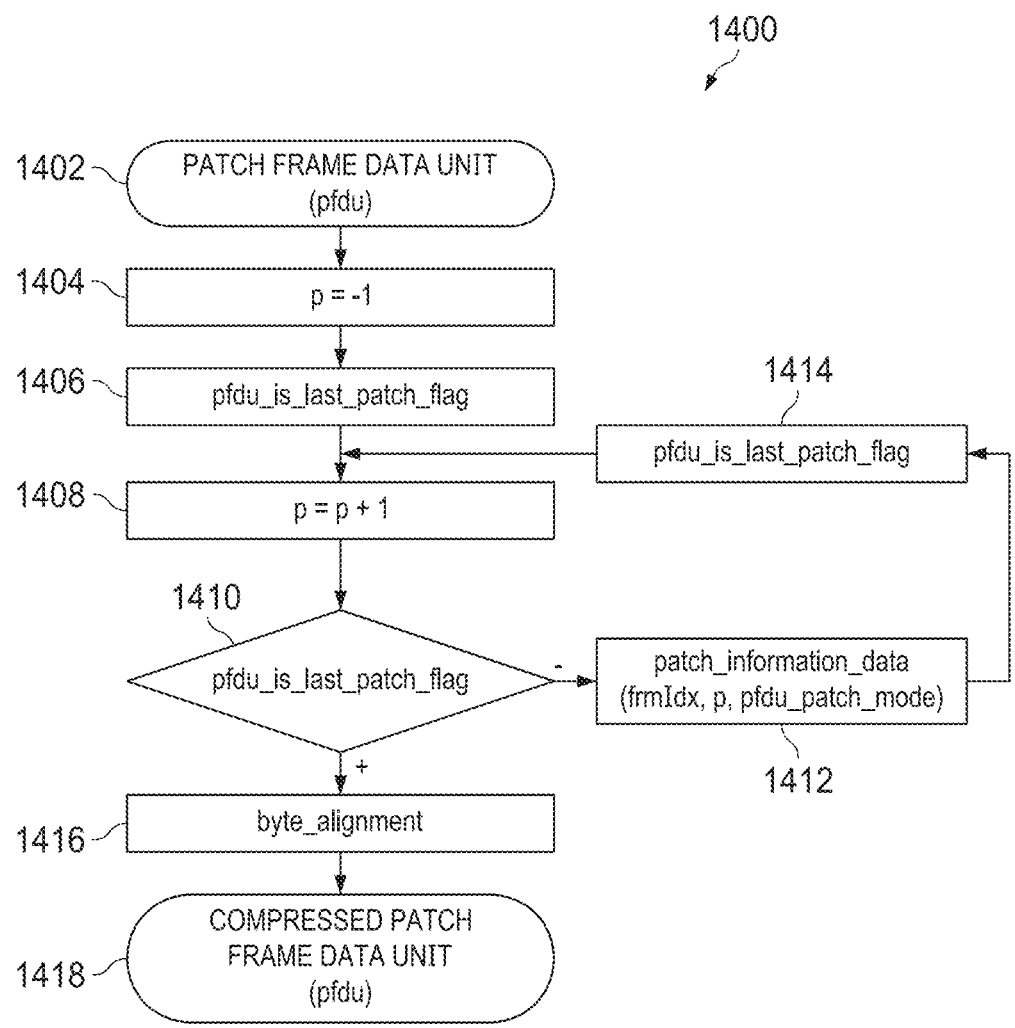
FIG. 14 is an embodiment of a patch frame data unit encoding process using a last patch flag.

FIG. 14 is an embodiment of a patch frame data unit encoding process 1400 using a last patch flag. The patch frame data unit encoding process 1400 may be utilized to encode (a.k.a., compress) a plurality of patch data units such as the patch data unit 734 of FIG. 7. The patch frame data unit encoding process 1400 may be implemented by an encoder.

In block 1402, a patch frame data unit (pfdu) is obtained. The patch frame data unit may be received by a receiver of the encoder. The patch frame data unit includes a plurality of the patch data units (e.g., patches 502).

In block 1404, the patch index (p) is decremented. By decrementing the patch index, the patch index may start with a negative value (e.g., −1). In block 1406, a last patch flag is added to each of the plurality of patches. In an embodiment, the last patch flag is designated pfdu_is_last_patch_flag. The last patch flag may be set or assigned a value according to the patch type of each patch. For example, the patch flag may indicate that the patch type for a patch is one of skip, intra, inter, PCM, or last.

In block 1408, the patch index is incremented to effectively initialize the patch index to start at zero. In block 1410, a determination of whether the patch type for the current patch data unit from the plurality of patch data units that correspond to a patch frame data unit is the last patch type is made based on a value of the last patch flag. When the current patch data unit is not the last patch, the process 1400 proceeds to block 1412. In block 1412, the patch information data is encoded for the current patch data unit. In an embodiment, the patch information data includes a frame index (frmIdx), the patch index (p), and the patch type (pdfu_patch_mode) as well as the corresponding 2D and 3D information. In block 1412 of the process 1400, the patch type may be skip, inter, intra, or PCM, but not last. In block 1414, the last patch flag is encoded.

After the encoding in block 1414, the process 1400 loops back to block 1408. There, the patch index is incremented. By incrementing the patch index, a new current patch is considered. These steps are iterated until the current patch is determined to be the last patch in block 1410 based on the value of the last patch flag.

When the current patch is determined to be the last patch based on the last patch flag, the process 1400 proceeds to block 1416. In block 1416, a byte alignment process is performed. Then, in block 1418, a compressed patch frame data unit is achieved. The compressed patch frame data unit may be incorporated into a bitstream for transmission toward a decoder.

Figure 15:
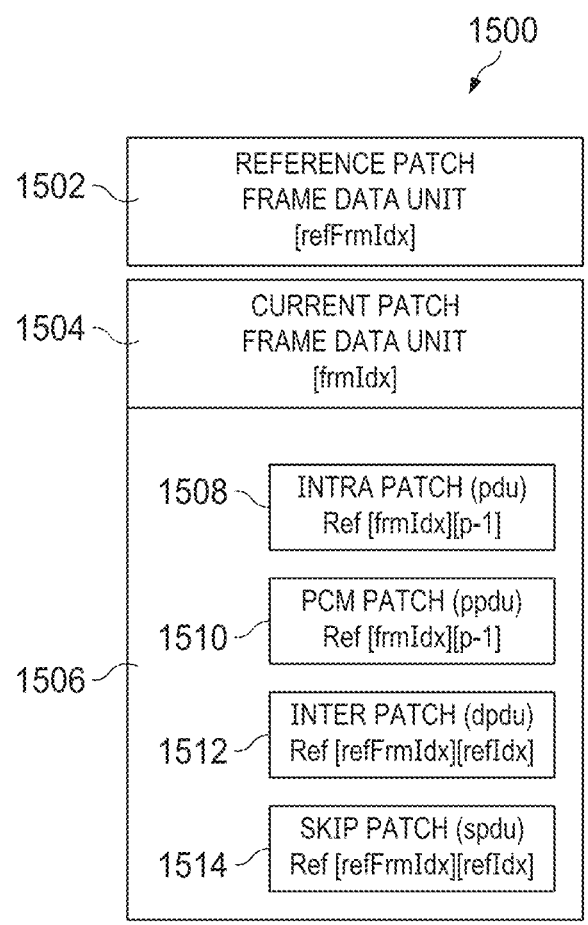
FIG. 15 is an embodiment of a patch information data frame with a description of patch unit types.

FIG. 15 is an embodiment of a patch information data frame 1500 with a description of patch unit types. The patch information data frame (patch frame data unit) 1500 is similar to the patch frame (patch frame data unit) 732 in FIG. 7. As shown, patch information data frame 1500 includes a reference patch frame data unit (indicated by the refFrmIdx) 1502, a current patch frame data unit (frmIdx) 1504, and a patch information unit 1506. The reference patch frame data unit 1502 includes, for example, a reference frame used in connection with inter or skip prediction. The current patch frame data unit 1504 contains the plurality of patch data units being encoded or decoded. The patch information data unit 1506 includes patches patch data units (e.g., patch 502) having one of the available patch types. In an embodiment, the patch data unit can be of an intra patch type (pdu) 1508, a PCM patch type (ppdu) 1510, an inter patch type (dpdu) 1512, and a skip patch type (spdu) 1514. There can be any number of the patches in the patch information unit 1506, and the patches can be in any order.

Figure 16:
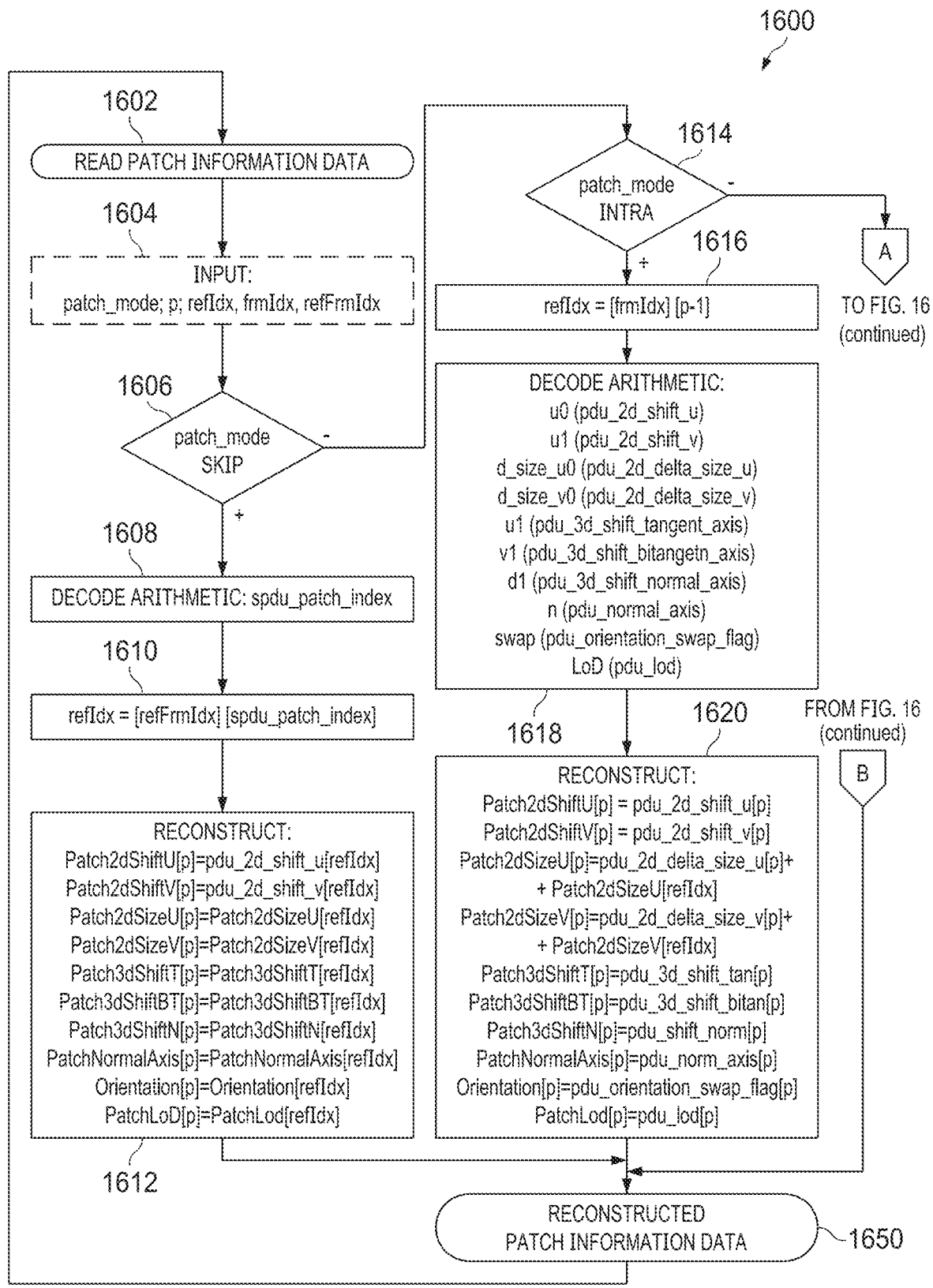
FIG. 16 is an embodiment of a patch frame data unit decoding process.
Figure 16:
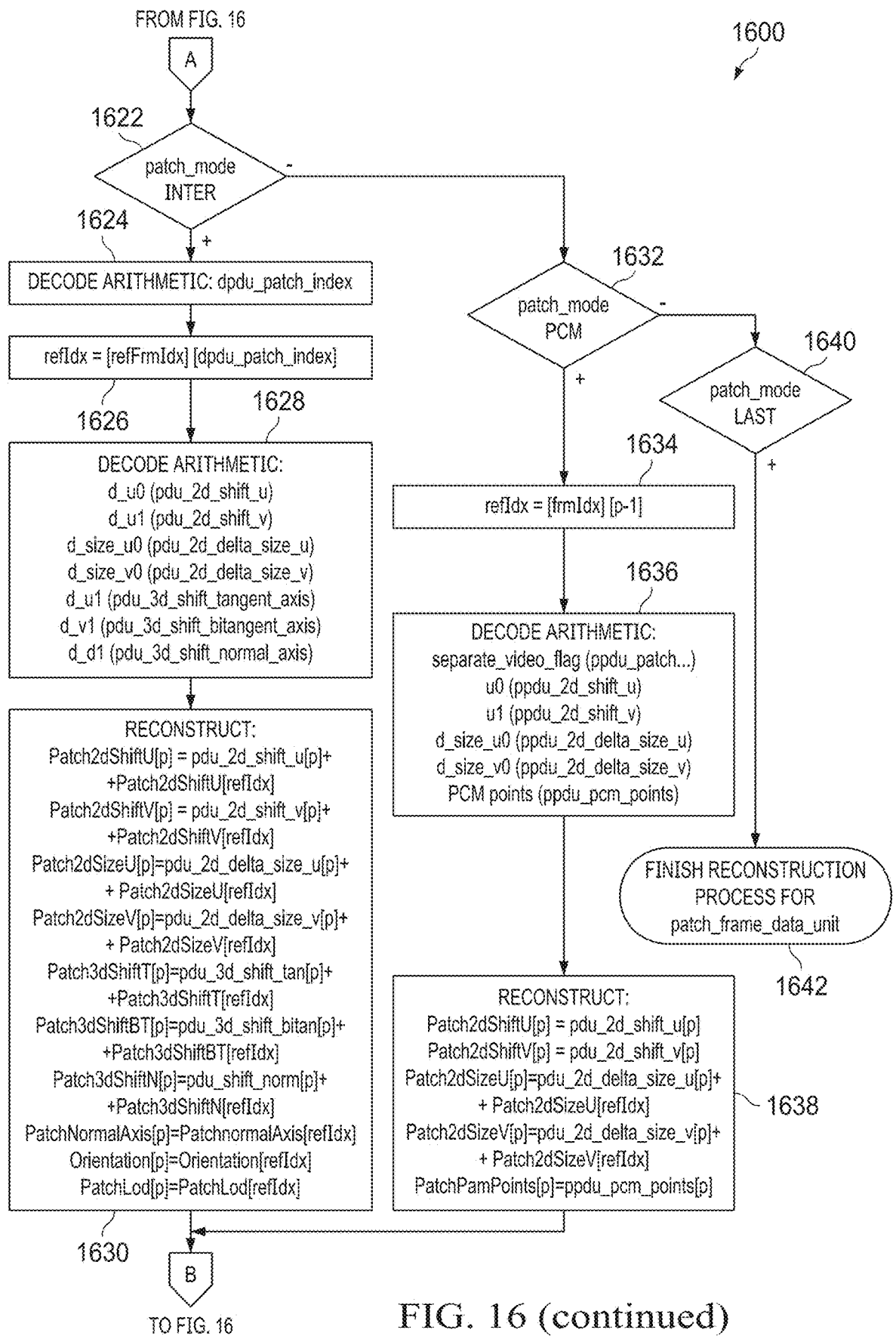

FIG. 16 is an embodiment of a patch frame data unit decoding process 1600. The patch frame data unit decoding process 1600 may be utilized to decode (a.k.a., decompress) a volumetric image that was encoded by an encoder. The patch frame data unit decoding process 1600 may be implemented by an encoder (e.g., entropy decoding unit 70).

In block 1602, encoded patch information data is received and read. The encoded patch information data may be received by a receiver of the decoder as part of a bitstream. The encoded patch information data contains the data and information needed to decode the volumetric image that was encoded by the encoder. For example, the encoded patch information data includes a plurality of patch data units (e.g., patches 502 or patch data units 850) that have been compressed and are needed to reconstruct a volumetric image (e.g., the 3D point cloud) from the patches. As part of block 1602, a patch (e.g., an initial patch data unit or a current patch data unit) from the plurality of patches may be obtained once the process 1600 has been initiated.

In block 1604, an input corresponding to the encoded patch information data is received. In an embodiment, the input corresponds to one or more of the compressed patches. In an embodiment, the input comprises one or more of the patch_mode, a patch index, the reference index, a frame index, and a reference frame index corresponding to the patch.

In block 1606, a determination of whether the patch type for the patch is a skip patch type is made. When the patch type for the patch is a skip patch type, the process 1600 proceeds to block 1608. In block 1608, a reference patch index (spdu_patch_index) corresponding to the patch is decoded. That is, a value of the reference patch index is decoded. In an embodiment, the spdu_patch_index is an index of the patch in the reference frame, indicated by the refFrmIdx.

In block 1610, a reference index (refIdx) for the patch is determined based on a reference frame index ([refFrmIdx]) corresponding to the patch and the reference patch index as decoded when the patch type is the skip patch type. In an embodiment, the reference index, which may also be referred to as a reference patch index (RefPatchIdx), is determined based on the following: RefPatchIdx=predictorIdx+spdu_patch_index [frmIdx][p], where predictorIdx is a predictor index, spdu_patch_index is a skip type patch data unit index, frmIdx is a frame index, and p is the patch index. In an embodiment, the current patch frame data unit index (frmIdx) and a pointer to the correct patch data unit in the patch index (p) point to the proper spot in the multi-dimensional array to find the actual reference index for the patch.

In block 1612, the patch is reconstructed based on the reference index that was determined when the patch type is the skip patch type. In an embodiment, the patch is reconstructed according to the following:

Reconstruct:
    Patch2dShiftU[frmIdx][p]=Patch2dShiftU[refIdx][RefPatchIdx]*ops_occupancy_packing_block_size
    Patch2dShiftV[frmIdx][p]=Patch2dShiftV[refIdx][RefPatchIdx]*ops_occupancy_packing_block_size
    Patch2dSizeU[frmIdx][p]=Patch2dSizeU[refIdx][RefPatchIdx]*ops_occupancy_packing_block_size
    Patch2dSizeV[frmIdx][p]=Patch2dSizeV[refIdx][RefPatchIdx]*ops_occupancy_packing_block_size
    Patch3dShiftTangentAxis[frmIdx][p]= Patch3dShiftTangentAxis[refIdx][RefPatchIdx]
    Patch3dShiftBiTangentAxis[frmIdx][p]= Patch3dShiftBiTangentAxis[refIdx][RefPatchIdx]
    Patch3dShiftNormalAxis[frmIdx][p]= Patch3dShiftNormalAxis[refIdx][RefPatchIdx]
    PatchNormalAxis[frmIdx][p]=PatchNormalAxis[refIdx][RefPatchIdx]
    PatchTangentAxis[frmIdx][p]=PatchTangentAxis[refIdx][RefPatchIdx]
    PatchBiTangentAxis[frmIdx][p]=PatchBiTangentAxis[refIdx][RefPatchIdx]
    PatchOrientationSwapFlag[frmIdx][p]= PatchOrientationSwapFlag[refIdx][RefPatchIdx]
    PatchLod[frmIdx][p]=PatchLod[refIdx][RefPatchIdx]
    PatchProjectionMode[frmIdx][p]=dpdu_projection_mode[frmIdx][p]

In an embodiment, the patch is reconstructed according to the following:

Reconstruct:
    Patch2dShiftU[p]=pdu_2d_shift_u[refIdx]
    Patch2dShiftV[p]=pdu_2d_shift_v[refIdx]
    Patch2dSizeU[p]=Patch2dSizeU[refIdx]
    Patch2dSizeV[p]=Patch2dSizeV[refIdx]
    Patch3dShiftT[p]=Patch3dShiftT[refIdx]
    Patch3dShiftBT[p]=Patch3dShiftBT[refIdx]
    Patch3dShiftN[p]=Patch3dShiftN[refIdx]
    PatchNormalAxis[p]=PatchNormalAxis[refIdx]
    Orientation[p]=Orientation[refIdx]
    PatchLod[p]=PatchLod[refIdx]

In block 1650, the reconstructed patch information data is collected (e.g., stored in memory) and the process 1600 loops back to block 1602 so a new patch can be decoded.

In block 1614, a determination of whether the patch type for the patch data unit is an intra patch type is made. When the patch type for the patch is an intra patch type, the process 1600 proceeds to block 1616. In block 1616, the reference patch data unit index (refIdx) for the patch data unit is determined based on a previous patch data unit (corresponding to the patch and a decremented patch index) in a current frame index ([frmIdx]). In an embodiment, the current frame (e.g., the patch frame data unit) is used for the reference.

In block 1618, the patch is decoded using two dimensional (2D) components corresponding to the patch and three dimensional (3D) components corresponding to the patch. In an embodiment, the patch is decoded according to the following:

Decode Arithmetic:
    u0 (pdu_2d_shift_u)
    u1 (pdu_2d_shift_v)
    d_size_u0 (pdu_2d_delta_size_u)
    d_size_v0 (pdu_2d_delta_size_v)
    u1 (pdu_3d_shift_tangent_axis)
    v1 (pdu_3d_shift_bitangent_axis)
    d1 (pdu_3d_shift_normal_axis)
    n (pdu_norml_axis)
    swap (pdu_orientation_swap_flag)
    LOD (pdu_lod)

In block 1620, the patch is reconstructed based on the patch as decoded. In an embodiment, the patch is reconstructed according to the following:

Reconstruct:
    Patch2dShiftU[p]=pdu_2d_shift_u[p]
    Patch2dShiftV[p]=pdu_2d_shift_v[p]
    Patch2dSizeU[p]=pdu_2d_delta_size_u[p]++ Patch2dSizeU[refIdx]
    Patch2dSizeV[p]=pdu_2d_delta_size_v[p]++ Patch2dsizeV[refIdx]
    Patch3dShiftT[p]=pdu_3d_shift_tan[p]
    Patch3dShiftBT[p]=pdu_3d_shift_bitan[p]
    Patch3dShiftN[p]=pdu_shift_norm[p]
    PatchNormalAxis[p]=pdu_norm_axis[p]
    Orientation[p]=pdu_orientation_swap_flag[p]
    PatchLod[p]=pdu_Iod[p]

In block 1650, the reconstructed patch information data is collected (e.g., stored in memory) and the process 1600 loops back to block 1602 so a new patch can be decoded.

In block 1622, a determination of whether the patch type for the patch is an inter patch type is made. When the patch type for the patch is an inter patch type, the process 1600 proceeds to block 1624. In block 1624, a reference patch index (dpdu_patch_index) corresponding to the patch is decoded. That is, a value of the reference patch index is decoded. In block 1626, the reference index (refIdx) for the patch is determined based on the reference frame index ([refFrmIdx]) corresponding to the patch and the reference patch index as decoded.

In block 1628, the patch is decoded using two dimensional (2D) components corresponding to the patch and three dimensional (3D) components corresponding to the patch. In an embodiment, the patch is decoded according to the following:

Decode Arithmetic:
    d_u0 (pdu_2d_shift_u)
    d_u1 (pdu_2d_shift_v)
    d_size_u0 (pdu_2d_delta_size_u)
    d_size_v0 (pdu_2d_delta_size_v)
    d_u1 (pdu_3d_shift_tangent_axis)
    d_v1 (pdu_3d_shift_bitangent_axis)
    d_d1 (pdu_3d_shift-normal_axis)

In block 1630, the patch is reconstructed based on the patch as decoded. In an embodiment, the patch is reconstructed according to the following:

Reconstruct:
   Patch2dShiftU[p]=pdu_2d_shift_u[p]+
      +Patch2dShiftU[refIdx]
   Patch2dShiftVf[p]=pdu_2d_shift_v[p]++Patch2dshiftV
      [refIdx]
   Patch2dsizeU[p]=pdu_2d_delta_size_u[p]++
      Patch2dSizeU[refIdx]
   Patch2dSizeV[p]=pdu_2d_delta_size_v[p]++
      Patch2dSize[V[refIdx]
   Patch3dShiftT[p]=pdu_3d_shift_tan[p]++Patch3dshiftT
      [refIdx]
   Patch3dShiftBT[p]=pdu_3d_shift_bitan[p]++
      patch3dshiftBT[refIdx]
   Patch3dShiftN[p]=pdu_shift_norm[p]++Patch3dShiftN
      [refIdx]
   PatchNormalAxis[p]=PatchnormalAxis[refIdx]
   Orientation[p]=Orientation[refIdx]
   PatchLod[p]=PatchLod[refIdx]

In block 1650, the reconstructed patch information data is collected (e.g., stored in memory) and the process 1600 loops back to block 1602 so a new patch can be decoded.

In block 1632, a determination of whether the patch type for the patch is a PCM patch (or a raw) patch type is made. When the patch type for the patch is a PCM patch type, the process 1600 proceeds to block 1634. In block 1634, the reference index (refIdx) for the patch is determined based on a frame index ([frmIdx]) corresponding to the patch and a decremented patch index.

In block 1636, the patch is decoded using two dimensional (2D) components corresponding to the patch and three dimensional (3D) components corresponding to the patch. In an embodiment, the 2D and 3D components comprise the following:

Decode Arithmetic:
   separate_video_flag (ppdu_patch . . . )
   u0 (ppdu_2d_shift_u)
   u1 (ppdu_2d_shift_y)
   d_size_u0 (ppdu_2d_delta_size_u)
   d_sze_v0 (ppdu_2d_delta_size_v)
   PCM points (ppdu_pcm_points)

In block 1638, the patch is reconstructed based on the patch as decoded. In an embodiment, the patch is reconstructed according to the following:
Reconstruct:
   Patch2dShiftU[p]=pdu_2d_shift_u[p]
   Patch2dShiftV[p]=pdu_2d_shifty[p]
   Patch2dSizeU[p]=pdu_2d_deltasize_u[p]++
      Patch2dSizeU[refIdx]
   Patch2dSizeV[p]=pdu_2d_delta_sizev[p]++
      Patch2dSizeV[refIdx]
   PatchPcmPoints[p]=ppdu_pcm_points[p]

In block 1650, the reconstructed patch information data is collected (e.g., stored in memory) and the process 1600 loops back to block 1602 so a new patch can be decoded.

In block 1640, a determination of whether the patch type for the patch is a last patch type is made. When the patch type for the patch is a last patch type, the process 1600 proceeds to block 1642. In block 1642, the reconstruction process corresponding to the encoded patch information data is terminated when the patch type is the last patch type. That is, the reconstruction process is finished. In an embodiment, any data included in the patch having the last patch type may be decoded before the patch frame data unit decoding process 1600 is terminated.

Figure 17:
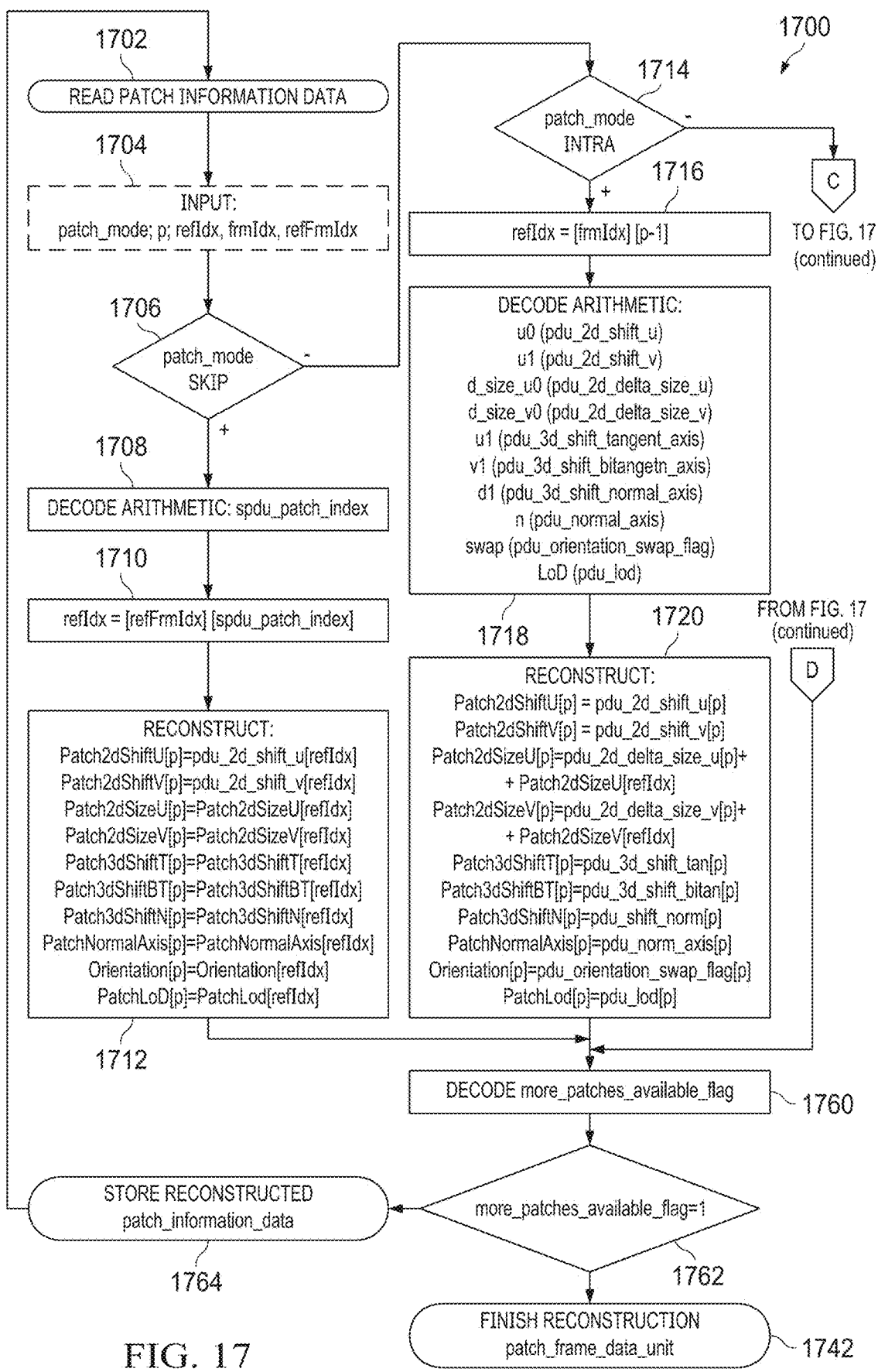
FIG. 17 is an embodiment of a patch frame data unit decoding process using a last patch flag.
Figure 17:
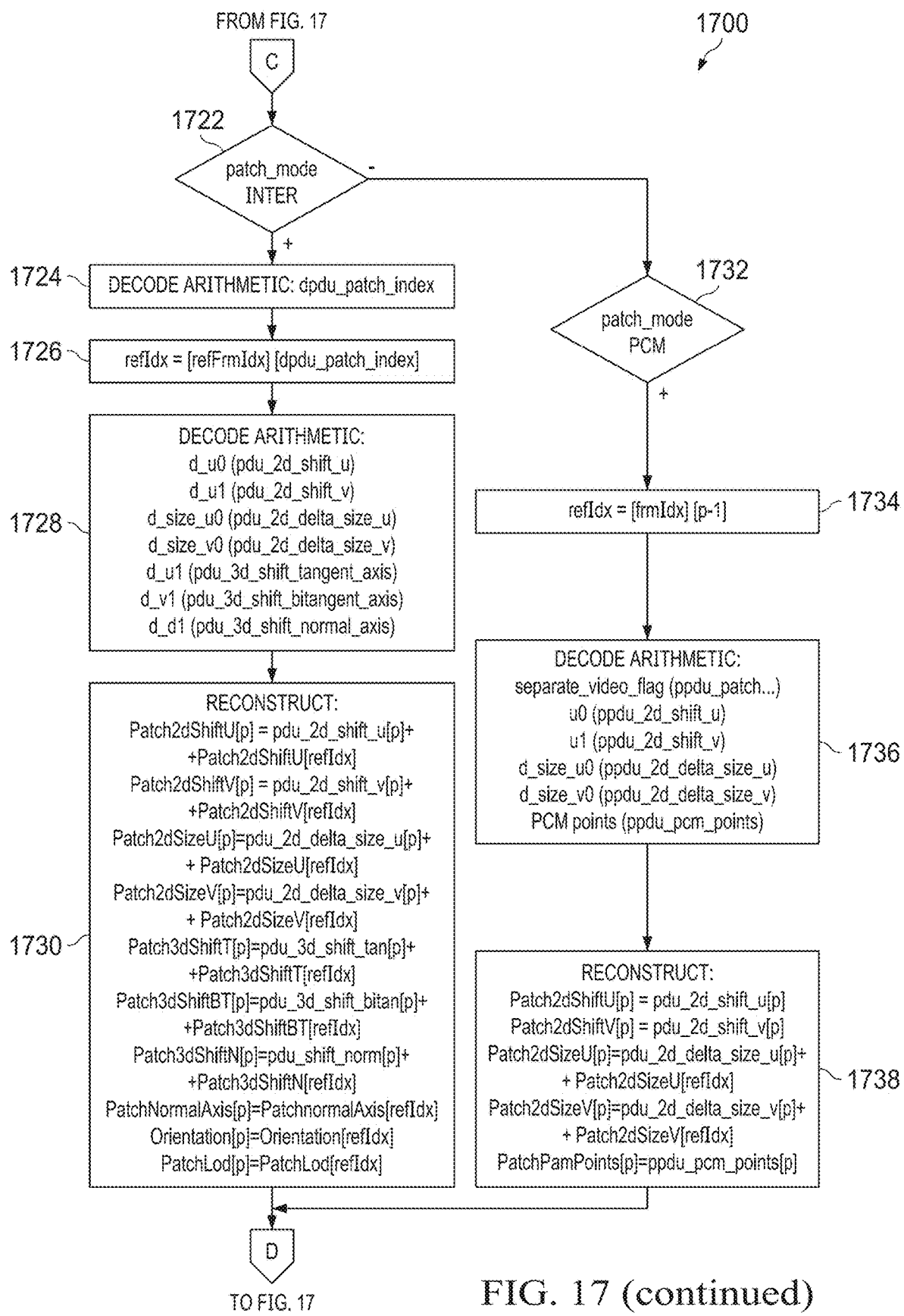

FIG. 17 is an embodiment of a patch frame data unit decoding process 1700. The patch frame data unit decoding process 1700 may be utilized to decode (a.k.a., decompress) a volumetric image that was encoded by an encoder. The frame patch data unit decoding process 1700 may be implemented by an encoder (e.g., entropy decoding unit 70).

In block 1702, encoded patch information data is received and read. The encoded patch information data may be received by a receiver of the decoder as part of a bitstream. The encoded patch information data contains the data and information needed to decode the volumetric image that was encoded by the encoder. For example, the encoded patch information data includes a plurality of patch data units (e.g., patches 502 or patch data units 850) that have been compressed needed to reconstruct a volumetric image (e.g., the 3D point cloud) from the patches. As part of block 1702, a patch (e.g., an initial patch or a current patch) from the plurality of patches may be obtained once the process 1700 has been initiated.

In block 1704, an input corresponding to the encoded patch information data is received. In an embodiment, the input corresponds to one or more of the compressed patches. In an embodiment, the input comprises one or more of the patch_mode, a patch index, the reference index, a frame index, and a reference frame index corresponding to the patch.

In block 1706, a determination of whether the patch type for the patch is a skip patch type is made. When the patch type for the patch is a skip patch type, the process 1700 proceeds to block 1708. In block 1708, a reference patch index (spdu_patch_index) corresponding to the patch is decoded (or determined). That is, a value of the reference patch index is decoded or determined.

In block 1710, a reference index (refIdx) for the patch is determined based on a reference frame index ([refFrmIdx]) corresponding to the patch and the reference patch index as decoded when the patch type is the skip patch type. In an embodiment, the reference index, which may also be referred to as a reference patch index (RefPatchIdx), is determined based on the following: RefPatchIdx=predictorIdx+spdu_patch_index [frmIdx][p], where predictorIdx is a predictor index, spdu_patch_index is a skip type patch data unit index, frmIdx is a frame index, and p is the patch index.

In block 1712, the patch is reconstructed based on the reference index that was determined when the patch type is the skip patch type. In an embodiment, the patch is reconstructed according to the following:
Reconstruct:
   Patch2dShiftU[frmIdx][p]=Patch2dShiftU[refIdx][Ref-
      PatchIdx]*ops_occupancy_packing_block_size
   Patch2dShiftV[frmIdx][p]=Patch2dShiftV[refIdx][Ref-
      PatchIdx]*ops_occupancy_packing_block_size
   Patch2dSizeU[frmIdx][p]=Patch2dSizeU[refIdx][Ref-
      PatchIdx]*ops_occupancy_packing_block_size
   Patch2dSizeV[frmIdx][p]=Patch2dSizeV[refIdx][Ref-
      PatchIdx]*ops_occupancy_packing_block_size
   Patch3dShiftTangentAxis[frmIdx][p]=
   Patch3dShiftTangentAxis[refIdx][RefPatchIdx]
   Patch3dShiftBiTangentAxis[frmIdx][p]=
   Patch3dShiftBiTangentAxis[refIdx][RefPatchIdx]
   Patch3dShiftNormalAxis[frmIdx][p]=
   Patch3dShiftNormalAxis[refIdx][RefPatchIdx]
   PatchNormalAxis[frmIdx][p]=PatchNormalAxis[refIdx]
      [RefPatchIdx]
   PatchTangentAxis[frmIdx][p]=PatchTangentAxis[refIdx]
      [RefPatchIdx]
   PatchBiTangentAxis[frmIdx][p]=PatchBiTangentAxis
      [refIdx][RefPatchIdx]
   PatchOrientationSwapFlag[frmIdx][p]=

PatchOrientationSwapFlag[refIdx][RefPatchIdx]
PatchLod[frmIdx][p]=PatchLod[refIdx][RefPatchIdx]
PatchProjectionMode[frmIdx][p]=dpdu_projection_mode[frmIdx][p]

In an embodiment, the patch is reconstructed according to the following:
Reconstruct:
  Patch2dShiftU[p]=pdu_2d_shift_u[refIdx]
  Patch2dShiftV[p]=pdu_2d_shift_v[refIdx]
  Patch2dSizeU[p]=Patch2dSizeU[refIdx]
  Patch2dSizeV[p]=Patch2dSize V[refIdx]
  Patch3dShiftT[p]=Patch3dShiftT[refIdx]
  Patch3dShiftBT[p]=Patch3dShiftBT[refIdx]
  Patch3dShiftN[p]=Patch3dShiftN[refIdx]
  PatchNormalAxis[p]=PatchNormalAxis[refIdx]
  Orientation[p]=Orientation[refIdx]
  PatchLod[p]=PatchLod[refIdx]

In block 1760, a flag is decoded to determine whether there are more patches to consider. In an embodiment, the flag is designated more_patches_available_flag. In block 1762, a value of the flag is determined. When the flag has a first value (e.g., one), the process 1700 proceeds to block 1764. In block 1764, the reconstructed patch information data is stored and the process loops back to block 1702 so a new patch can be decoded. When the flag has a second value (e.g., zero), the process 1700 proceeds to block 1742. In block 1742, the reconstruction process corresponding to the encoded patch information data is terminated when the patch type is the last patch type. That is, the reconstruction process is finished.

In block 1714, a determination of whether the patch type for the patch data unit is an intra patch type is made. When the patch type for the patch is an intra patch type, the process 1700 proceeds to block 1716. In block 1716, the reference patch data unit index (refIdx) for the patch data unit is determined based on a previous patch data unit (corresponding to the patch and a decremented patch index) in a current frame index ([frmIdx.

In block 1718, the patch is decoded using two dimensional (2D) components corresponding to the patch and three dimensional (3D) components corresponding to the patch. In an embodiment, the patch is decoded according to the following:
Decode Arithmetic:
  u0 (pdu_2d_shift_u)
  u1 (pdu_2d_shift_v)
  d_size_u0 (pdu_2d_delta_size_u)
  d_size_v0 (pdu_2d_delta_size_v)
  u1 (pdu_3d_shift_tangent_axis)
  v1 (pdu_3d_shift_bitangent_axis)
  d1 (pdu_3d_shift_normal_axis)
  n (pdu_normI_axis)
  swap (pdu_orientation_swap_flag)
  L0D (pdu_Iod)

In block 1720, the patch is reconstructed based on the patch as decoded. In an embodiment, the patch is reconstructed according to the following:
Reconstruct:
  Patch2dShiftU[p]=pdu_2d_shift_u [p]
  Patch2dShiftV[p]=pdu_2d_shift_v [p]
  Patch2dSizeU[p]=pdu_2d_delta_size_u            [p]++ Patch2dSizeU[refIdx]
  Patch2dSizeV[p]=pdu_2d_delta_size_v            [p]++ Patch2dsizeV[refIdx]
  Patch3dShiftT[p]=pdu_3d_shift_tan[p]
  Patch3dShiftBT[p]=pdu_3d_shift_bitan[p]
  Patch3dShiftN[p]=pdu_shift_norm[p]
  PatchNormalAxis[p]=pdu_norm_axis[p]
  Orientation[p]=pdu_orientation_swap_flag [p]
  PatchLod[p]=pdu_Iod[p]

In block 1760, a flag is decoded to determine whether there are more patches to consider. In an embodiment, the flag is designated more_patches_available_flag. In block 1762, a value of the flag is determined. When the flag has a first value (e.g., one), the process 1700 proceeds to block 1764. In block 1764, the reconstructed patch information data is stored and the process 1700 loops back to block 1702 so a new patch can be decoded. When the flag has a second value (e.g., zero), the process 1700 proceeds to block 1742. In block 1742, the reconstruction process corresponding to the encoded patch information data is terminated when the patch type is the last patch type. That is, the reconstruction process is finished.

In block 1722, a determination of whether the patch type for the patch is an inter patch type is made. When the patch type for the patch is an inter patch type, the process 1700 proceeds to block 1724. In block 1724, a reference patch index (dpdu_patch_index) corresponding to the patch is decoded. That is, a value of the reference patch index is decoded. In block 1726, the reference index (refIdx) for the patch is determined based on the reference frame index ([refFrmIdx]) corresponding to the patch and the reference patch index as decoded.

In block 1728, the patch is decoded using two dimensional (2D) components corresponding to the patch and three dimensional (3D) components corresponding to the patch. In an embodiment, the patch is decoded according to the following:
Decode Arithmetic:
  d_u0 (pdu_2d_shift_u)
  d_u1 (pdu_2d_shift_v)
  d_size_u0 (pdu_2d_delta_size_u)
  d_size_v0 (pdu_2d_delta_size_v)
  d_u1 (pdu_3d_shift_tangent_axis)
  d_v1 (pdu_3d_shift_bitangent_axis)
  d_d1 (pdu_3d_shift-normal_axis)

In block 1730, the patch is reconstructed based on the patch as decoded. In an embodiment, the patch is reconstructed according to the following:
Reconstruct:
  Patch2dShiftU[p]=pdu_2d_shift_u  [p]++Patch2dShiftU [refIdx]
  Patch2dShiftVf[p]=pdu_2d_shift_v  [p]++Patch2dshiftV [refIdx]
  Patch2dsizeU[p]=pdu_2d_delta_size_u            [p]++ Patch2dSizeU[refIdx]
  Patch2dSize   V[p]=pdu_2d_delta_size_v         [p]++ Patch2dSize V[refIdx]
  Patch3dShiftT[p]=pdu_3d_shift_tan[p]++Patch3dshiftT [refIdx]
  Patch3dShiftBT[p]=pdu_3d_shift_bitan[p]++ patch3dshiftBT[refIdx]
  Patch3dShiftN[p]=pdu_shift_norm[p]++Patch3dShiftN [refIdx]
  PatchNormalAxis[p]=PatchnormalAxis[refIdx]
  Orientation[p]=Orientation[refIdx]
  PatchLod[p]=PatchLod[refIdx]

In block 1760, a flag is decoded to determine whether there are more patches to consider. In an embodiment, the flag is designated more_patches_available_flag. In block 1762, a value of the flag is determined. When the flag has a first value (e.g., one), the process 1700 proceeds to block 1764. In block 1764, the reconstructed patch information data is stored and the process 1700 loops back to block 1702 so a new patch can be decoded. When the flag has a second value (e.g., zero), the process 1700 proceeds to block 1742. In block 1742, the reconstruction process corresponding to the encoded patch information data is terminated when the patch type is the last patch type. That is, the reconstruction process is finished.

In block 1732, a determination of whether the patch type for the patch is a PCM patch (or a raw) patch type is made. When the patch type for the patch is a PCM patch type, the process 1700 proceeds to block 1734. In block 1734, the reference index (refIdx) for the patch is determined based on a frame index ([frmIdx]) corresponding to the patch and a decremented patch index.

In block 1736, the patch is decoded using two dimensional (2D) components corresponding to the patch and three dimensional (3D) components corresponding to the patch. In an embodiment, the 2D and 3D components comprise the following:

Decode Arithmetic:
  separate_video_flag (ppdu_patch . . . )
  u0 (ppdu_2d_shift_u)
  u1 (ppdu_2d_shift_y)
  d_size_u0 (ppdu_2d_delta_size_u)
  d_sze_v0 (ppdu_2d_delta_size_v)
  PCM points (ppdu_pcm_points)

In block 1738, the patch is reconstructed based on the patch as decoded. In an embodiment, the patch is reconstructed according to the following:

Reconstruct:
  Patch2dShiftU[p]=pdu_2d_shift_u [p]
  Patch2dShiftV[p]=pdu_2d_shifty[p]
  Patch2dSizeU[p]=pdu_2d_deltasize_u[p]++
    Patch2dSizeU[refIdx]
  Patch2dSizeV[p]=pdu_2d_delta_sizev[p]++Patch2dSize
    V[refIdx]
  PatchPcmPoints[p]=ppdu_pcm_points [p]

In block 1760, a flag is decoded to determine whether there are more patches to consider. In an embodiment, the flag is designated more_patches_available_flag. In block 1762, a value of the flag is determined. When the flag has a first value (e.g., one), the process 1700 proceeds to block 1764. In block 1764, the reconstructed patch information data is stored and the process 1700 loops back to block 1702 so a new patch can be decoded. When the flag has a second value (e.g., zero), the process 1700 proceeds to block 1742. In block 1742, the reconstruction process corresponding to the encoded patch information data is terminated when the patch type is the last patch type. That is, the reconstruction process is finished.

Figure 18:
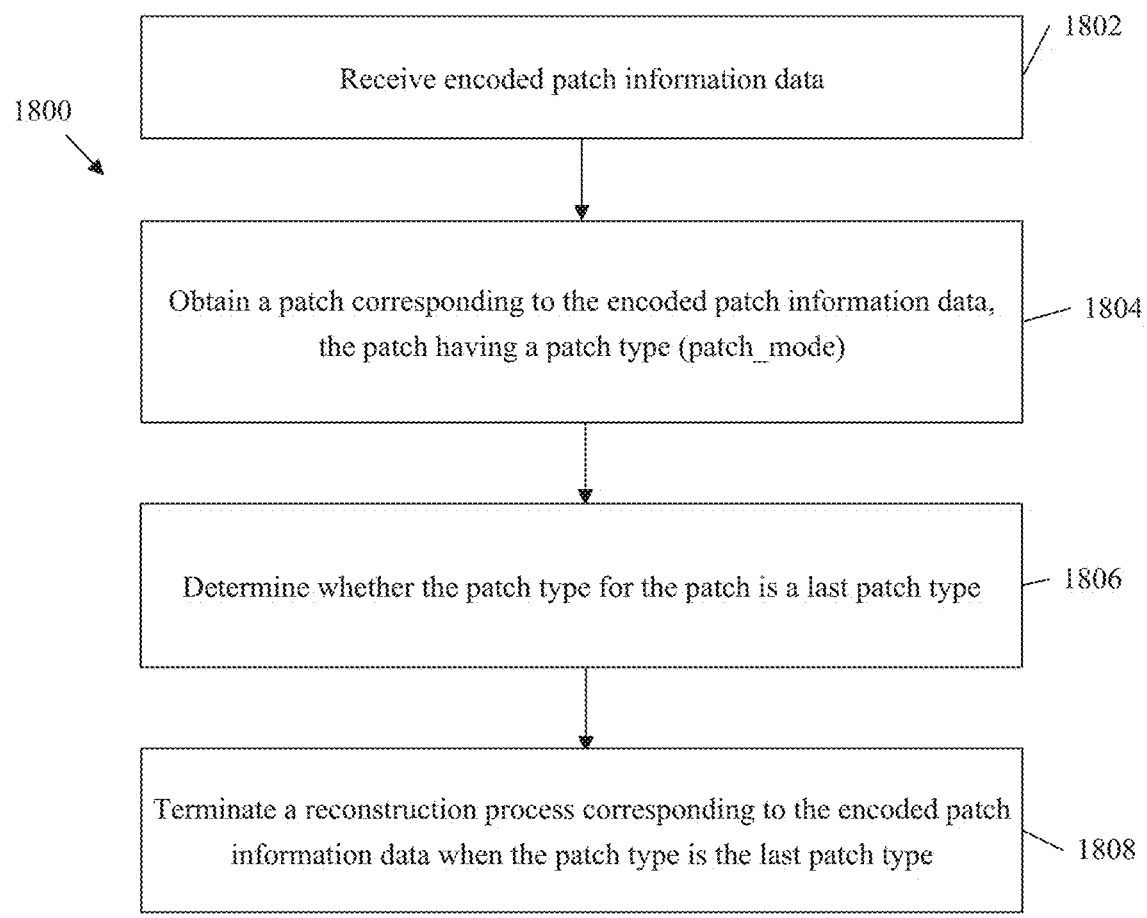
FIG. 18 is an embodiment of a method of point cloud coding (PCC) implemented by a decoder.

FIG. 18 is an embodiment of a method 1800 of PCC implemented by a decoder (e.g., entropy decoding unit 70). The method 1800 may be used to decode an encoded bitstream in order to reconstruct a volumetric image. In block 1802, a receiver of the decoder receives encoded patch information data. The encoded patch information may include information corresponding to a plurality of patches (e.g., patches 502). In block 1804, a processor of the decoder obtains a patch corresponding to the encoded patch information data. The patch has a patch type (patch_mode). The patch type may be, for example, skip, intra, inter, PCM, or last.

In block 1806, a processor of the decoder determines whether the patch type for the patch is a last patch type. In block 1808, a processor of the decoder terminates a reconstruction process corresponding to the encoded patch information data when the patch type is the last patch type.

Figure 19:
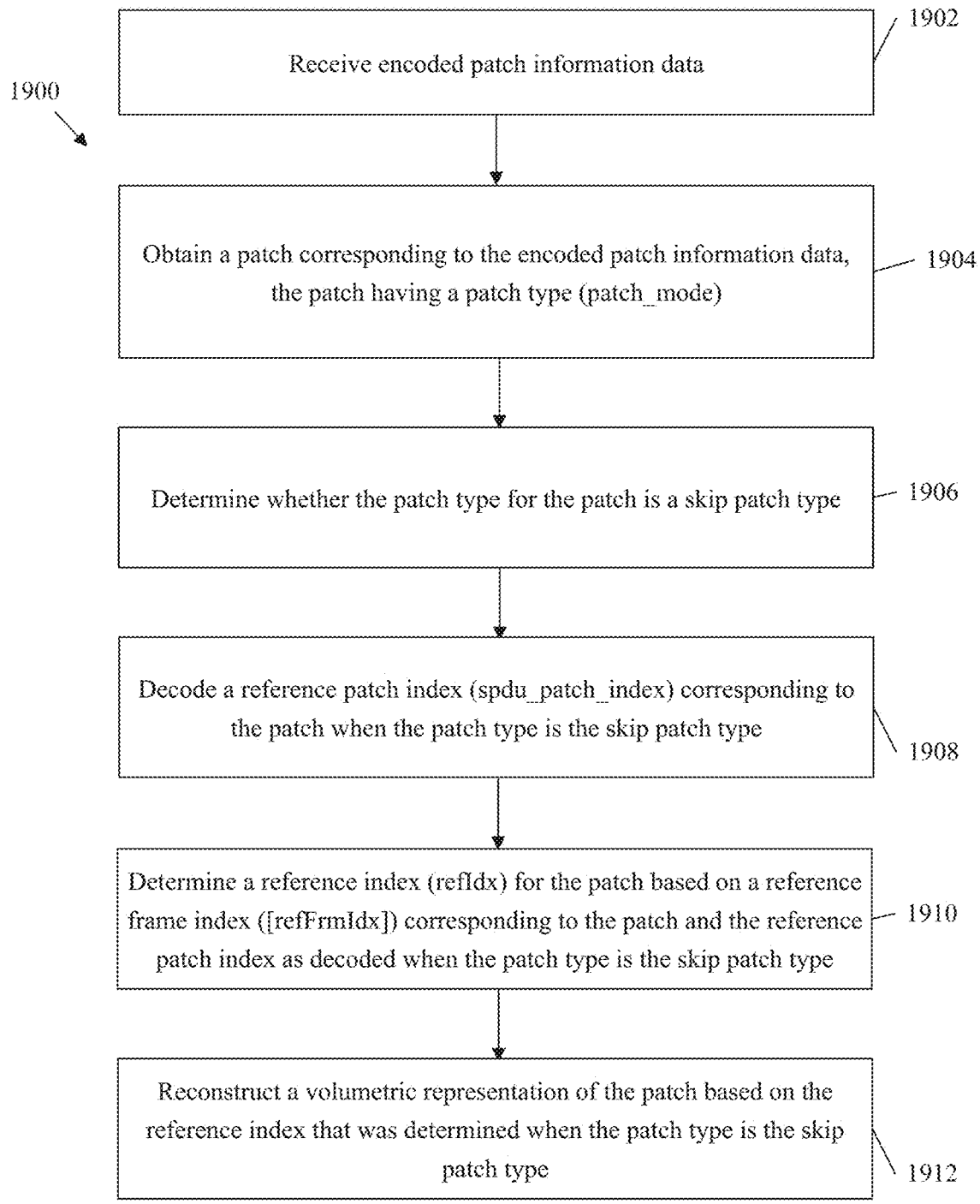
FIG. 19 is an embodiment of a method of PCC implemented by a decoder.

FIG. 19 is an embodiment of a method 1900 of PCC implemented by a decoder (e.g., entropy decoding unit 70). The method 1900 may be used to decode an encoded bitstream in order to reconstruct a volumetric image. In block 1902, a receiver of the decoder receives encoded patch information data. The encoded patch information may include information corresponding to a plurality of patches (e.g., patches 502). In block 1904, a processor of the decoder obtains a patch corresponding to the encoded patch information data. The patch has a patch type (patch_mode). The patch type may be, for example, skip, intra, inter, PCM, or last.

In block 1906, a processor of the decoder determines whether the patch type for the patch is a skip patch type. In block 1908, a processor of the decoder decodes a reference patch index (spdu_patch_index) corresponding to the patch when the patch type is the skip patch type. In block 1910, a processor of the decoder determines a reference index (refIdx) for the patch based on a reference frame index ([refFrmIdx]) corresponding to the patch and the reference patch index as decoded when the patch type is the skip patch type. In block 1912, a processor of the decoder reconstructs a volumetric representation of the patch based on the reference index that was determined when the patch type is the skip patch type. Once reconstructed, the 3D image may be displayed for a user on the display of an electronic device (e.g., smart phone, tablet, laptop computer, etc.).

Figure 20:
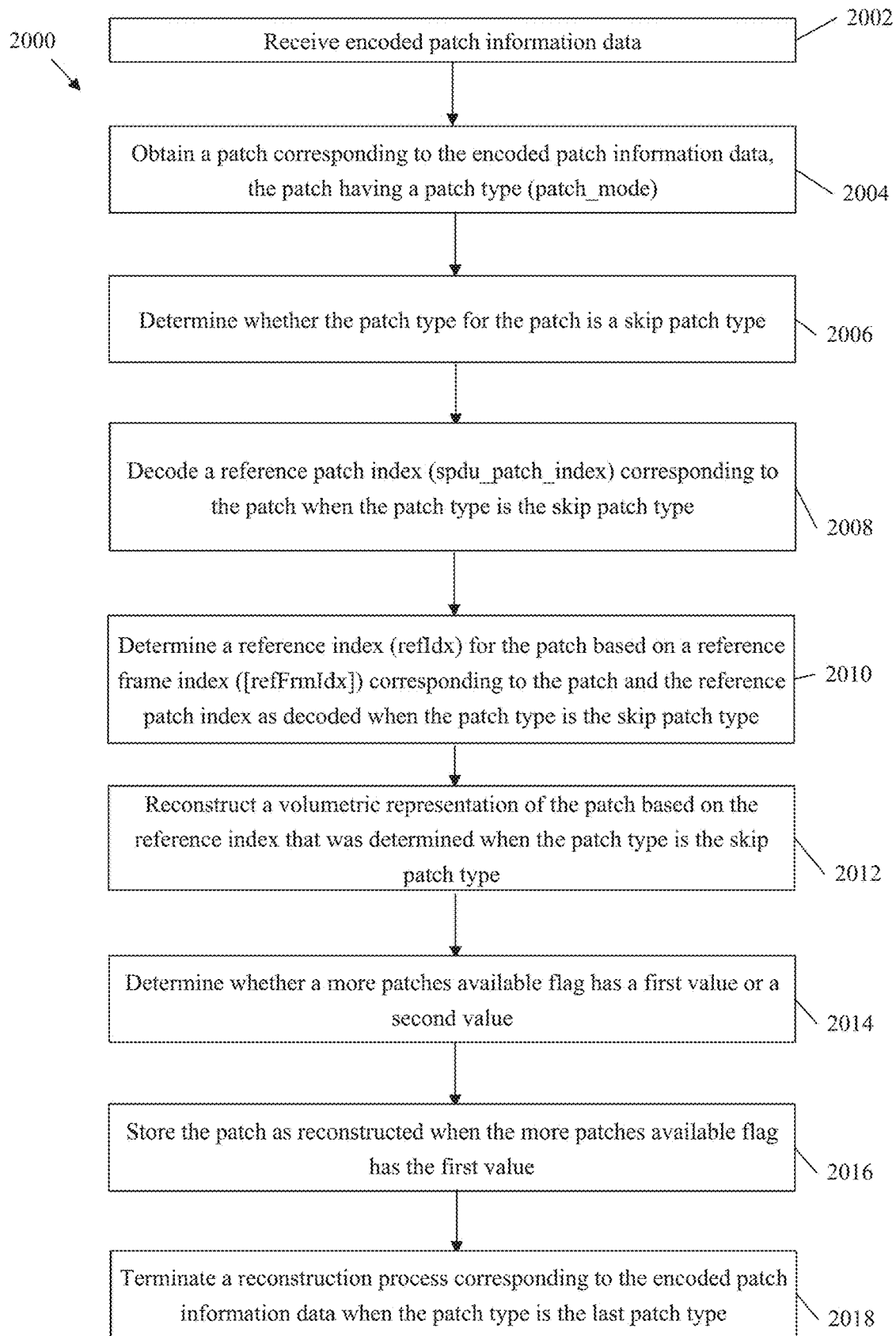
FIG. 20 is an embodiment of a method of PCC implemented by a decoder.

FIG. 20 is an embodiment of a method 2000 of PCC implemented by a decoder (e.g., entropy decoding unit 70). The method 2000 may be used to decode an encoded bitstream in order to reconstruct a volumetric image. In block 2002, a receiver of the decoder receives encoded patch information data. The encoded patch information may include information corresponding to a plurality of patches (e.g., patches 502). In block 2004, a processor of the decoder obtains a patch corresponding to the encoded patch information data. The patch has a patch type (patch_mode). The patch type may be, for example, skip, intra, inter, PCM, or last.

In block 2006, a processor of the decoder determines whether the patch type for the patch is a skip patch type. In block 2008, a processor of the decoder decodes a reference patch index (spdu_patch_index) corresponding to the patch when the patch type is the skip patch type. In block 2010, a processor of the decoder determines a reference index (refIdx) for the patch based on a reference frame index ([refFrmIdx]) corresponding to the patch and the reference patch index as decoded when the patch type is the skip patch type. In block 2012, a processor of the decoder reconstructs a volumetric representation of the patch based on the reference index that was determined when the patch type is the skip patch type.

In block 2014, a processor of the decoder determines whether a more patches available flag has a first value or a second value. In block 2016, the volumetric representation as reconstructed is stored in the memory of the decoder when the more patches available flag has the first value. Once all of the patches have been reconstructed, the 3D image may be displayed for a user on the display of an electronic device (e.g., smart phone, tablet, laptop computer, etc.).

In block 2018, a processor of the decoder terminates a reconstruction process of the encoded patch information data when the more patches available flag has the second value.

Figure 21:
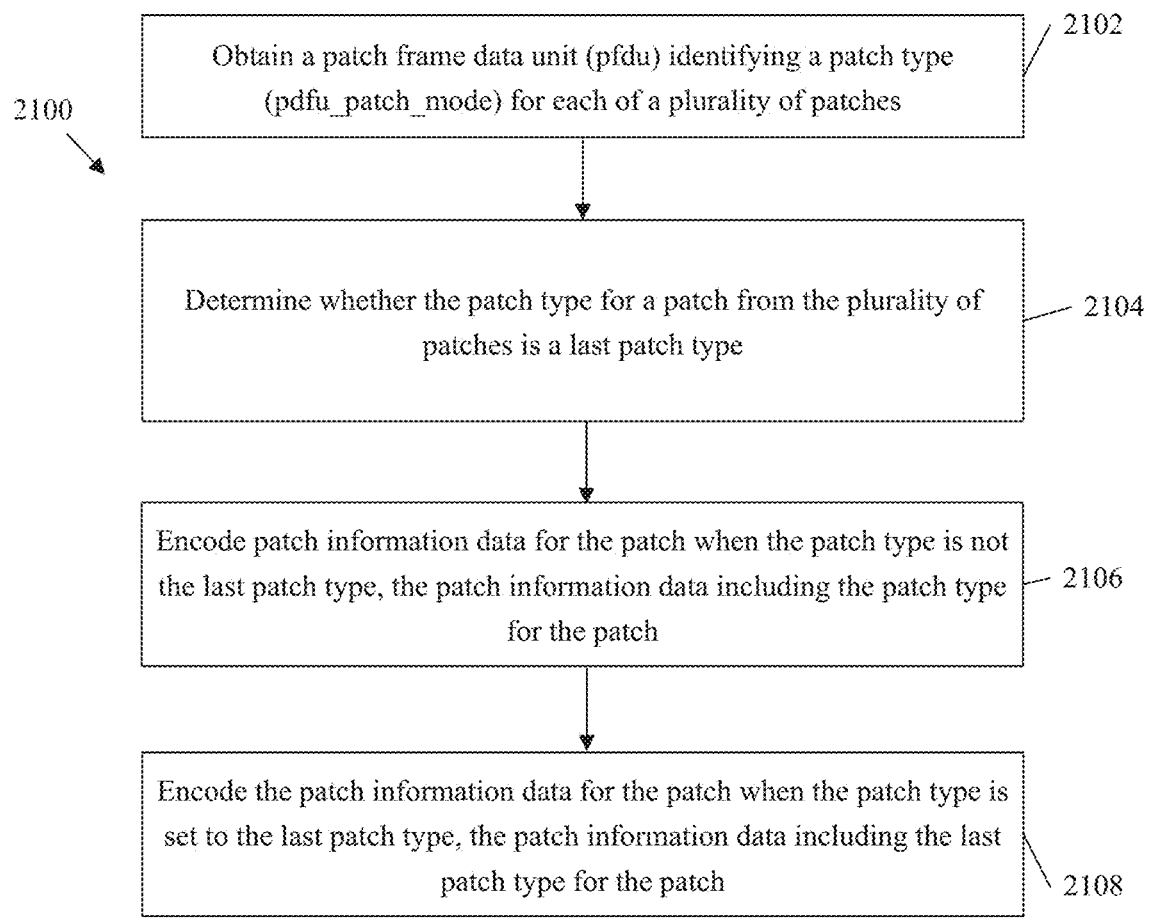
FIG. 21 is an embodiment of a method of PCC implemented by an encoder.

FIG. 21 is an embodiment of a method 2100 of PCC implemented by an encoder (e.g., entropy encoding unit 56).

The method 2100 may be performed to encode a volumetric image into a bitstream for transmission toward a decoder. In block 2102, a receiver of the encoder obtains a patch frame data unit (pfdu) identifying a patch type (pdfu_patch_mode) for each of a plurality of patches. In block 2104, a processor of the encoder determines whether the patch type for a patch from the plurality of patches is a last patch type.

In block 2106, the processor of the encoder encodes patch information data for the patch when the patch type is not the last patch type, the patch information data including the patch type for the patch. In block 2108, the processor of the encoder encodes the patch information data for the patch when the patch type is set to the last patch type. The patch information data includes the last patch type for the patch.

In an embodiment, the patch information data and the last patch type are encoded into a bitstream that is transmitted toward the decoder.

Figure 22:
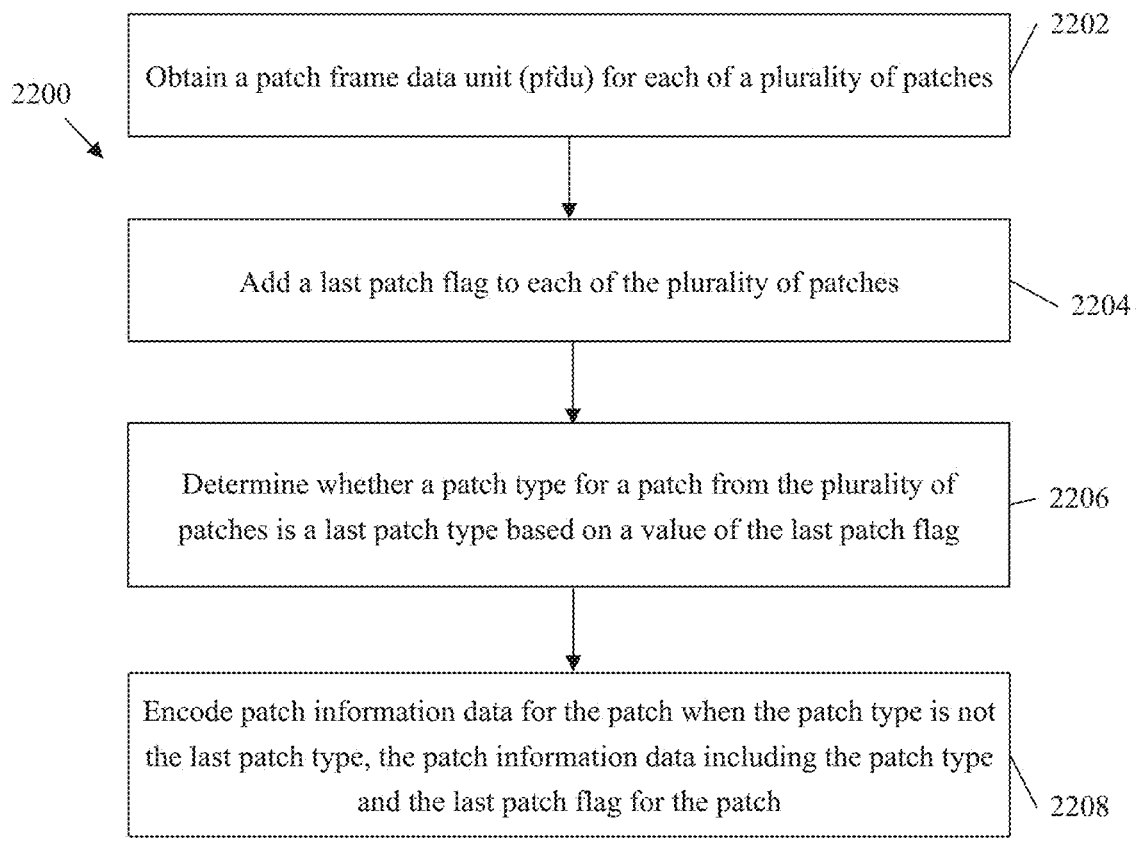
FIG. 22 is an embodiment of a method of PCC implemented by an encoder.

FIG. 22 is an embodiment of a method 2200 of PCC implemented by an encoder (e.g., entropy encoding unit 56). The method 2200 may be performed to encode a volumetric image into a bitstream for transmission toward a decoder. In block 2202, a receiver of the encoder obtains a patch frame data unit (pfdu) for each of a plurality of patches. In block 2204, the processor of the encoder adds a last patch flag to each of the plurality of patches.

In block 2206, the processor of the encoder determines whether a patch type for a patch from the plurality of patches is a last patch type based on a value of the last patch flag. In block 2208, the processor of the encoder encodes patch information data for the patch when the patch type is not the last patch type, the patch information data including the patch type and the last patch flag for the patch.

In an embodiment, the patch information data including the patch type and the last patch flag are encoded into a bitstream that is transmitted toward the decoder.

Figure 23:
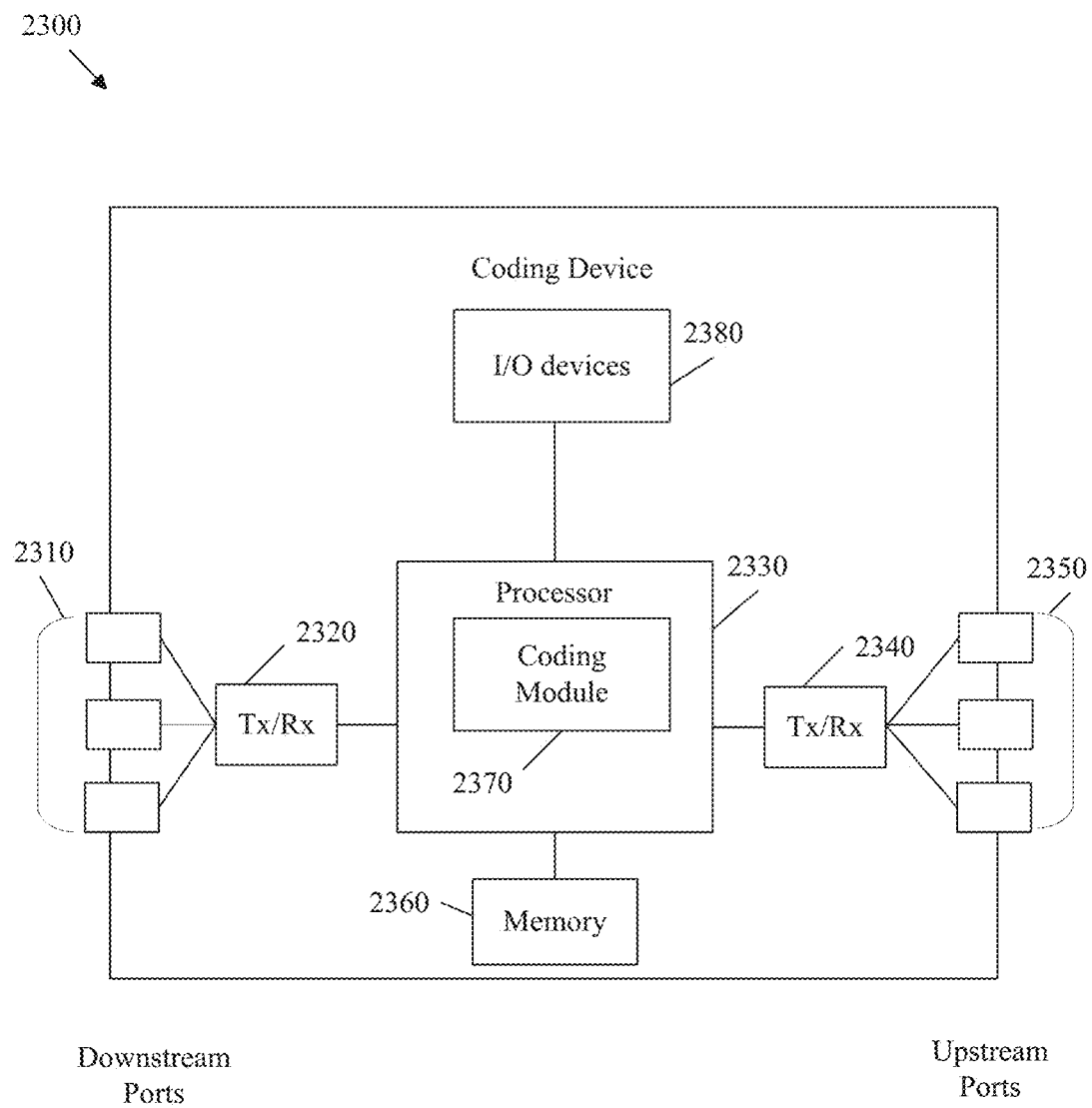
FIG. 23 is a schematic diagram of a coding device.

FIG. 23 is a schematic diagram of a coding device 2300 (e.g., an encoder 22, a decoder 28, etc.) according to an embodiment of the disclosure. The coding device 2300 is suitable for implementing the methods and processes disclosed herein. The coding device 2300 comprises ingress ports 2310 and receiver units (Rx) 2320 for receiving data; a processor, logic unit, or central processing unit (CPU) 2330 to process the data; transmitter units (Tx) 2340 and egress ports 2350 for transmitting the data; and a memory 2360 for storing the data. The coding device 2300 may also comprise optical-to-electrical (OE) components and electrical-to-optical (EO) components coupled to the ingress ports 2310, the receiver units 2320, the transmitter units 2340, and the egress ports 2350 for egress or ingress of optical or electrical signals.

The processor 2330 is implemented by hardware and software. The processor 2330 may be implemented as one or more CPU chips, cores (e.g., as a multi-core processor), field-programmable gate arrays (FPGAs), application specific integrated circuits (ASICs), and digital signal processors (DSPs). The processor 2330 is in communication with the ingress ports 2310, receiver units 2320, transmitter units 2340, egress ports 2350, and memory 2360. The processor 2330 comprises a coding module 2370. The coding module 2370 implements the disclosed embodiments described above. In an embodiment, the coding module 2370 is a reconstruction module configured to project a reconstructed volumetric image. The inclusion of the coding module 2370 therefore provides a substantial improvement to the functionality of the coding device 2300 and effects a transformation of the coding device 2300 to a different state. Alternatively, the coding module 2370 is implemented as instructions stored in the memory 2360 and executed by the processor 2330.

The coding device 2300 may also include input and/or output (I/O) devices 2380 for communicating data to and from a user. The I/O devices 2380 may include output devices such as a display for displaying video data, speakers for outputting audio data, etc. The I/O devices 2380 may also include input devices, such as a keyboard, mouse, trackball, etc., and/or corresponding interfaces for interacting with such output devices.

The memory 2360 comprises one or more disks, tape drives, and solid-state drives and may be used as an overflow data storage device, to store programs when such programs are selected for execution, and to store instructions and data that are read during program execution. The memory 2360 may be volatile and non-volatile and may be read-only memory (ROM), random-access memory (RAM), ternary content-addressable memory (TCAM), and static random-access memory (SRAM).

Figure 24:
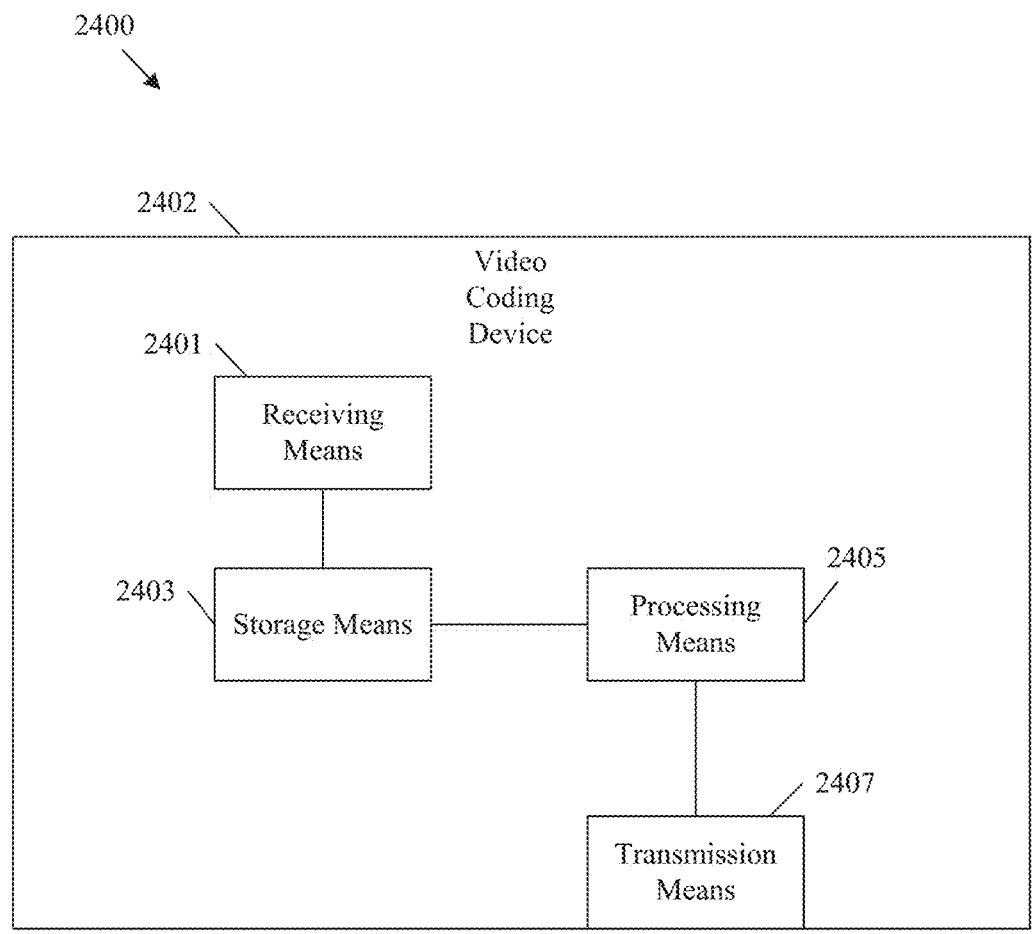
FIG. 24 is a schematic diagram of an embodiment of a means for coding.

FIG. 24 is a schematic diagram of an embodiment of a means for coding 2400. In embodiment, the means for coding 2400 is implemented in a coding device 2402 (e.g., an encoder 22 or a decoder 28). The coding device 2402 includes receiving means 2401. The receiving means 2401 is configured to receive a picture to encode or to receive a bitstream to decode. The coding device 2402 includes transmission means 2407 coupled to the receiving means 2401. The transmission means 2407 is configured to transmit the bitstream to a decoder or to transmit a decoded image to a display means (e.g., one of the I/O devices 2380).

The coding device 2402 includes a storage means 2403. The storage means 2403 is coupled to at least one of the receiving means 2401 or the transmission means 2407. The storage means 2403 is configured to store instructions. The coding device 2402 also includes processing means 2405. The processing means 2405 is coupled to the storage means 2403. The processing means 2405 is configured to execute the instructions stored in the storage means 2403 to perform the methods disclosed herein.

In an embodiment, syntax suitable for implementing the concepts disclosed herein is provided.

Patch frame data unit (pfdu). In an embodiment, a special termination patch data unit type is introduced to indicate patch frame data unit termination.

| | Descriptor |
|---|---|
| patch_frame_data_unit( frmIdx ) { | |
|   p = −1 | |
|   while ( pfdu_patch_mode[ frmIdx ][ p ] != LAST ) { | |
|     p ++ | |
|     pfdu_patch_mode[ frmIdx ][ p ] | ae(v) |
|       patch_information_data(frmIdx, p, pfdu_patch_mode[ frmIdx ][ p ]) | |
|   } | |
| } | |

|   | Descriptor |
|---|---|
| PfduTotalNumberOfPatches[ frmIdx ] = p<br>if( sps_point_local_reconstruction_enabled_flag )<br>  point_local_reconstruction( )<br>byte_alignment( )<br>} | |

In an embodiment, a special one bit (1-bit) flag is added to each patch data unit to indicate patch frame data unit termination.

|   | Descriptor |
|---|---|
| patch_frame_data_unit( frmIdx) {<br>  p = −1<br>  pfdu_more_patches_available_flag<br>  while ( more_patches_available_flag ) {<br>    p ++<br>    pfdu_patch_mode[ frmIdx ][ p ]<br>    patch_information_data(frmIdx, p, pfdu_patch_mode[ frmIdx ][ p ])<br>    pfdu_more_patches_available_flag<br>  }<br>  PfduTotalNumberOfPatches[ frmIdx ] = p + 1<br>  if( sps_point_local_reconstruction_enabled_flag )<br>    point_local_reconstruction( )<br>  byte_alignment( )<br>} | ae(v)<br><br><br>ae(v)<br><br>ae(v) |

In an embodiment, the patch information data is as follows:

|   | Descriptor |
|---|---|
| patch_information_data (frmIdx, p, patch_mode ) ( ) {<br>  if(patch_mode = = SKIP ) {<br>    skip_patch_data_unit( frmIdx, p )<br>  }<br>  else if(patch_mode = = INTRA) {<br>    if( pfps_local_override_geometry_patch_enable_flag )<br>      pid_override_geometry_patch_flag[ frmIdx ][ p ]<br>      if( pid_override_geometry_patch_flag[ frmIdx ][ p ] )<br>        pid_geometry_patch_parameter_set_id[ frmIdx ][ p ]<br>    for( i = 0; i < sps_attribute_count; i++ )<br>      if( pfps_local_override_attribute_patch_enable_flag[ i ] ) {<br>        pid_override_attribute_patch_flag[ p ][ i ]<br>        if( pid_override_attribute_patch_flag[ p ][ i ] )<br>          pid_attribute_patch_parameter_set_id[ p ][ i ]<br>      }<br>    patch_data_unit( frmIdx, p )<br>  }<br>  else if( patch_mode = = P_INTER)<br>    delta_patch_data_unit( frmIdx, p )<br>  else if(patch_mode = = I_PCM || patch_mode = = P_PCM )<br>    pcm_patch_data_unit( frmIdx, p )<br>} | <br><br><br><br><br><br>ae(v)<br><br>ae(v)<br><br><br>ae(v)<br><br>ae(v) |

In an embodiment, the original delta_patch_data_unit syntax element is as follows:

|   | Descriptor |
|---|---|
| delta_patch_data_unit( frmIdx, patchIndex ) {<br>  dpdu_patch_index[ frmIdx ][ patchIndex ]<br>  dpdu_2d_shift_u[ frmIdx ][ patchIndex ]<br>  dpdu_2d_shift_v[ frmIdx ][ patchIndex ]<br>  dpdu_2d_delta_size_u[ frmIdx ][ patchIndex ]<br>  dpdu_2d_delta_size_v[ frmIdx ][ patchIndex ]<br>  dpdu_3d_shift_tangent_axis[ frmIdx ][ patchIndex ] | <br>ae(v)<br>ae(v)<br>ae(v)<br>ae(v)<br>ae(v)<br>ae(v) |

-continued

| | Descriptor |
|---|---|
| dpdu_3d_shift_bitangent_axis[ frmIdx ][ patchIndex ] | ae(v) |
| dpdu_3d_shift_normal_axis[ frmIdx ][ patchIndex ] | ae(v) |
| projectionFlag = 0 | |
| i = 0 | |
| while (i < sps_layer_count_minus1 + 1 && projectionFlag = = 0 ) { | |
|    projectionFlag | |
| = projectionFlag \| sps_layer_absolute_coding_enabled_flag[ i ] | |
|    i++ | |
| } | |
| if ( projectionFlag ) | |
|    dpdu_projection_mode[ frmIdx ][ patchIndex ] | ae(v) |
| } | |

In an embodiment, an added skip_patch_data_unit syntax element is as follows:

| | Descriptor |
|---|---|
| skip_patch_data_unit( frmIdx, patchIndex ) { | |
|    spdu_patch_index[ frmIdx ][ patchIndex ] | ae(v) |
| } | |

Because a skip patch data unit type has been introduced, the amount of overhead in the coded bitstream representation is reduced.

The semantics of the newly added elements is as follows.

spdu_patch_index[frmIdx][p] plus p specifies the index, PredIdx, of the patch in the patch frame with index RefIdx that corresponds to the first patch frame in the reference patch frame list.

The decoding process for patch data units coded in skip prediction mode is as follows. When pfdu_patch_mode[frmIdx][p] is equal to P_SKIP, then the process for decoding skip coded patch data units is used, with frmIdx and p as the inputs to that process and the outputs of that process (Patch2dShiftU, Patch2dShiftV, Patch2dSizeU, Patch2dSizeV, Patch3dShiftT, Patch3dShiftBT, Patch3dShiftN, PatchNormalAxis, Orientation, PatchLod) are used as the output.

From the foregoing, it should be recognized that the orientation of the patch may be different for the default projection process. The orientation of the patch may be signaled in a simplified manner using 1-bit flag. The mechanism to switch between default and preferred orientation is introduced.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of point cloud coding (PCC) implemented by a decoder, comprising:
obtaining a patch corresponding to encoded patch information data, wherein the patch has a patch type (patch_mode);
determining that the patch type for the patch is a skip type, an intra type, an inter type, or a last patch type; and
terminating a reconstruction process corresponding to the patch when the patch type for the patch is the last patch type.

2. The method of claim 1, further comprising:
obtaining a patch flag corresponding to the patch, wherein the patch flag indicates whether the patch type for the patch is the skip type, the intra type, the inter type, or the last patch type.

3. The method of claim 2, further comprising:
determining that the patch type for the patch is the inter type;
decoding a reference patch index (dpdu_patch_index) corresponding to the patch;
determining a reference index (refIdx) for the patch based on a reference frame index ([refFrmIdx]) corresponding to the patch and the reference patch index as decoded;
decoding the patch using two dimensional (2D) components corresponding to the patch and three dimensional (3D) components corresponding to the patch, wherein the 2D components and the 3D components are obtained based on the reference index (refIdx) for the patch; and
reconstructing a volumetric representation based on the patch as decoded.

4. The method of claim 2, further comprising:
determining that the patch type for the patch is the intra type;
determining a reference index (refIdx) for the patch based on a frame index ([frmIdx]) corresponding to the patch and a decremented patch index;
decoding the patch using two dimensional (2D) components corresponding to the patch and three dimensional (3D) components corresponding to the patch; and
reconstructing a volumetric representation based on the patch as decoded.

5. The method of claim 2, further comprising:
determining that the patch type for the patch is the skip type;
decoding a reference patch index (spdu_patch_index) corresponding to the patch when the patch type is the skip type;
determining a reference index (refIdx) for the patch based on a reference frame index ([refFrmIdx]) corresponding to the patch and the reference patch index as decoded when the patch type is the skip type; and
reconstructing a volumetric representation of the patch based on the reference index that was determined when the patch type is the skip type.

6. The method of claim 1, further comprising:
determining that the patch type for the patch is a pulse code modulation (PCM) patch type;
determining a reference index (refIdx) for the patch based on a frame index ([frmIdx]) corresponding to the patch and a decremented patch index;
decoding the patch using two dimensional (2D) components for independent points corresponding to the patch and three dimensional (3D) components for the independent points corresponding to the patch; and
reconstructing a volumetric representation based on the patch as decoded.

7. The method of claim 1, further comprising receiving an input corresponding to the patch, wherein the input comprises one or more of the patch type, a patch index, a reference index, a frame index, and a reference frame index.

8. The method of claim 1, further comprising displaying, on a display of an electronic device, an image generated based on a volumetric representation as reconstructed.

9. The method of claim 1, further comprising
determining whether a more patches available flag has a first value or a second value;
storing a volumetric representation as reconstructed when the more patches available flag has the first value; and
terminating the reconstruction process of the patch when the more patches available flag has the second value.

10. A method of point cloud coding (PCC) implemented by an encoder, comprising:
encoding a patch flag corresponding to a patch into a bitstream, wherein the patch flag indicates whether a patch type (patch_mode) for the patch is a skip type, an intra type, an inter type, or a last patch type, wherein the patch flag instructs a decoder to terminate a reconstruction process corresponding to the patch when the patch type for the patch is the last patch type; and
encoding the patch into the bitstream based on the patch type for the patch.

11. The method of claim 10, wherein the bitstream includes a frame index (frmIdx), two dimensional (2D) components corresponding to the patch, and three dimensional (3D) components corresponding to the patch.

12. The method of claim 10, further comprising determining whether the patch type for the patch is the last patch type and not encoding patch information data for subsequent patches which follow the patch when the patch is determined to have the last patch type.

13. A non-transitory computer-readable storage medium storing a bitstream that, when parsed by a coding device, is used by the coding device to generate a video, the bitstream comprising:
encoded patch information data;
a patch corresponding to the encoded patch information data;
a patch type (patch_mode) corresponding to the patch; and
a patch flag corresponding to the patch, wherein the patch flag indicates whether the patch type for the patch is a skip type, an intra type, an inter type, or a last patch type,
wherein the patch flag instructs the coding device to terminate a reconstruction process corresponding to the patch when the patch type for the patch is the last patch type.

* * * * *